US012558800B2

(12) United States Patent
Ham et al.

(10) Patent No.: US 12,558,800 B2
(45) Date of Patent: Feb. 24, 2026

(54) DEVICES AND METHODS DIRECTED TO SENSING USING SYNTHETIC MATERIALS

(71) Applicant: The Board of Trustees of the Leland Stanford Junior University, Stanford, CA (US)

(72) Inventors: Jooyeun Ham, San Francisco, CA (US); Zhenan Bao, Stanford, CA (US); Mark R. Cutkosky, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 246 days.

(21) Appl. No.: 18/020,411

(22) PCT Filed: Sep. 10, 2021

(86) PCT No.: PCT/US2021/049806
§ 371 (c)(1),
(2) Date: Feb. 8, 2023

(87) PCT Pub. No.: WO2022/056223
PCT Pub. Date: Mar. 17, 2022

(65) Prior Publication Data
US 2023/0294307 A1     Sep. 21, 2023

Related U.S. Application Data

(60) Provisional application No. 63/077,043, filed on Sep. 11, 2020.

(51) Int. Cl.
*B25J 15/08*     (2006.01)
*B25J 19/02*     (2006.01)
(Continued)

(52) U.S. Cl.
CPC ............... *B25J 15/08* (2013.01); *B25J 19/02* (2013.01); *G01D 5/24* (2013.01); *G01K 7/18* (2013.01)

(58) Field of Classification Search
CPC ............ B25J 15/08; B25J 19/02; B25J 13/08; B25J 13/086; G01D 5/24; G01K 7/18
See application file for complete search history.

(56) References Cited

U.S. PATENT DOCUMENTS

2017/0203443 A1     7/2017   Lessing et al.
2017/0356812 A1     12/2017  Madden et al.
(Continued)

OTHER PUBLICATIONS

USPTO. International Search Report and Written Opinion (PCT ISR) dated Feb. 7, 2022, for parent PCT Application No. PCT/US2021/049806, 10 pages. Applicant also submitted a copy of the PCT ISR with the filing of the instant patent application.
(Continued)

*Primary Examiner* — Son T Le
(74) *Attorney, Agent, or Firm* — Crawford Maunu PLLC

(57)          ABSTRACT

Certain examples are directed to an apparatus having a stretchable synthetic membrane material and series of patterned conductive or semiconductive sections. The stretchable synthetic membrane material may be provided with the series of patterned sections being integrated in or against the material (e.g., on similarly-configured robotic digits operating as a pair). One or more of these sections are electrically coupled to sensor circuitry which may also be secured to or embedded in the material. As the apparatus moves relative to an external object, various environmental parameters may be sensed via at least one sensor as the object and the digit(s) approach one another. Depending on how the sensor circuitry is configured, such parameters may include one or more of proximity, capacitance, temperature, impedance,
(Continued)

contact with the object, and movement of the robotic member relative to the external object.

20 Claims, 15 Drawing Sheets

(51) Int. Cl.
G01D 5/24 (2006.01)
G01K 7/18 (2006.01)

(56) References Cited

U.S. PATENT DOCUMENTS

2019/0110363 A1    4/2019  Bao et al.
2019/0150929 A1    5/2019  Gregan et al.
2020/0121479 A1*  4/2020  Thompson .............. B25J 9/104

OTHER PUBLICATIONS

Kim, Kyun Kyu, et al. "Highly sensitive and stretchable multidimensional strain sensor with prestrained anisotropic metal nanowire percolation networks." Nano letters 15.8 (2015): 5240-5247.

Ham, Jooyeun, et al. "UV-laser-machined stretchable multi-modal sensor network for soft robot interaction." npj Flexible Electronics 6.1 (2022): 94.

Ham, Jooyeun. Skin-like multi-modal sensing devices for dexterous robotic hands. Dissertation, Chapters 5-7, Stanford University, Jun. 2020 (91 pgs). Document available at: http://purl.stanford.edu/zg120sn9385.

Shintake, Jun, et al. "Soft robotic grippers." Advanced materials 30.29 (2018): 1707035.

Soft Robotics Inc. website (https://www.softroboticsinc.com), 6 pgs, printed May 2, 2024.

Park, Yong-Lae, et al. "Design and control of a bio-inspired soft wearable robotic device for ankle-foot rehabilitation." Bioinspiration & biomimetics 9.1 (2014): 016007.

Terryn, Seppe, et al. "Self-healing soft pneumatic robots." Science Robotics 2.9 (2017): eaan4268.

Lu, Nanshu, and Dae-Hyeong Kim. "Flexible and stretchable electronics paving the way for soft robotics." Soft Robotics 1.1 (2014): 53-62.

Case, Jennifer C., et al. "Robotic skins that learn to control passive structures." IEEE Robotics and Automation Letters 4.3 (2019): 2485-2492.

Wall, Vincent, Gabriel Zöller, and Oliver Brock. "A method for sensorizing soft actuators and its application to the RBO hand 2." 2017 IEEE International Conference on Robotics and Automation (ICRA). IEEE, 2017.

Morrow, John, et al. "Improving soft pneumatic actuator fingers through integration of soft sensors, position and force control, and rigid fingernails." 2016 IEEE international conference on robotics and automation (ICRA). IEEE, 2016.

Truby, Ryan L., et al. "Soft robotic fingers with embedded ionogel sensors and discrete actuation modes for somatosensitive manipulation." 2019 2nd IEEE international conference on soft robotics (RoboSoft). IEEE, 2019.

Hellebrekers, Tess, et al. "Liquid metal-microelectronics integration for a sensorized soft robot skin." 2018 IEEE/RSJ International Conference on Intelligent Robots and Systems (IROS). IEEE, 2018.

Case, Jennifer, et al. "Sensor skins: An overview." Stretchable Bioelectronics for Medical Devices and Systems (2016): 173-191.

Lopes, Pedro Alhais, et al. "Soft bioelectronic stickers: selection and evaluation of skin-interfacing electrodes." Advanced healthcare materials 8.15 (2019): 1900234.

Son, Donghee, et al. "Multifunctional wearable devices for diagnosis and therapy of movement disorders." Nature nanotechnology 9.5 (2014): 397-404. Abstract only.

Kim, Dae-Hyeong, et al. "Epidermal electronics." science 333.6044 (2011): 838-843.

Sim, Kyoseung, et al. "Metal oxide semiconductor nanomembrane-based soft unnoticeable multifunctional electronics for wearable human-machine interfaces." Science advances 5.8 (2019): eaav9653.

Hua, Qilin, et al. "Skin-inspired highly stretchable and conformable matrix networks for multifunctional sensing." Nature communications 9.1 (2018): 244.

Kim, J., Lee, M., Shim, H. et al. Stretchable silicon nanoribbon electronics for skin prosthesis. Nat Commun 5, 5747 (2014).

* cited by examiner

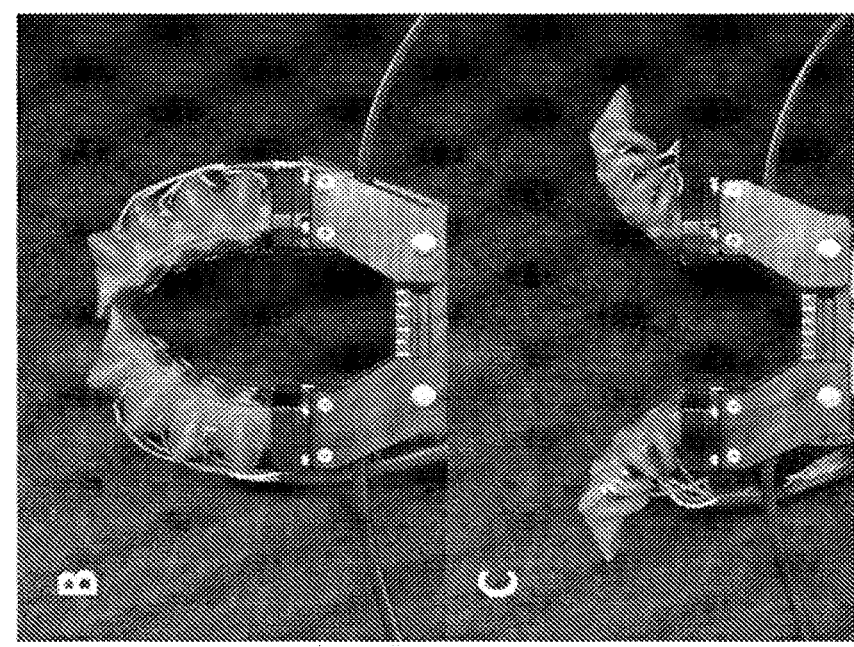
FIG. 1B
FIG. 1C
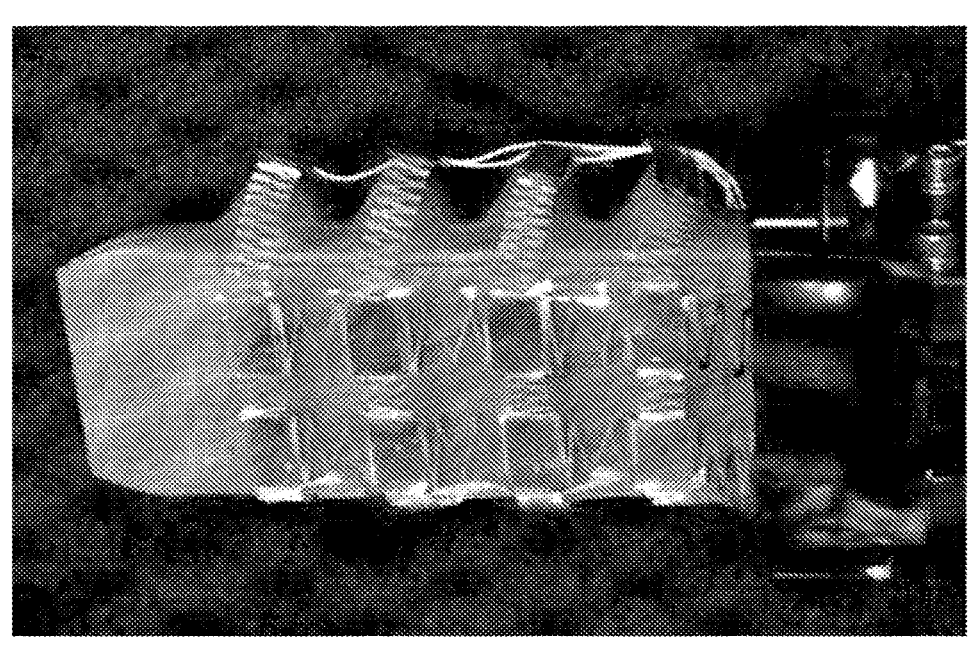
FIG. 1A 110
120
130

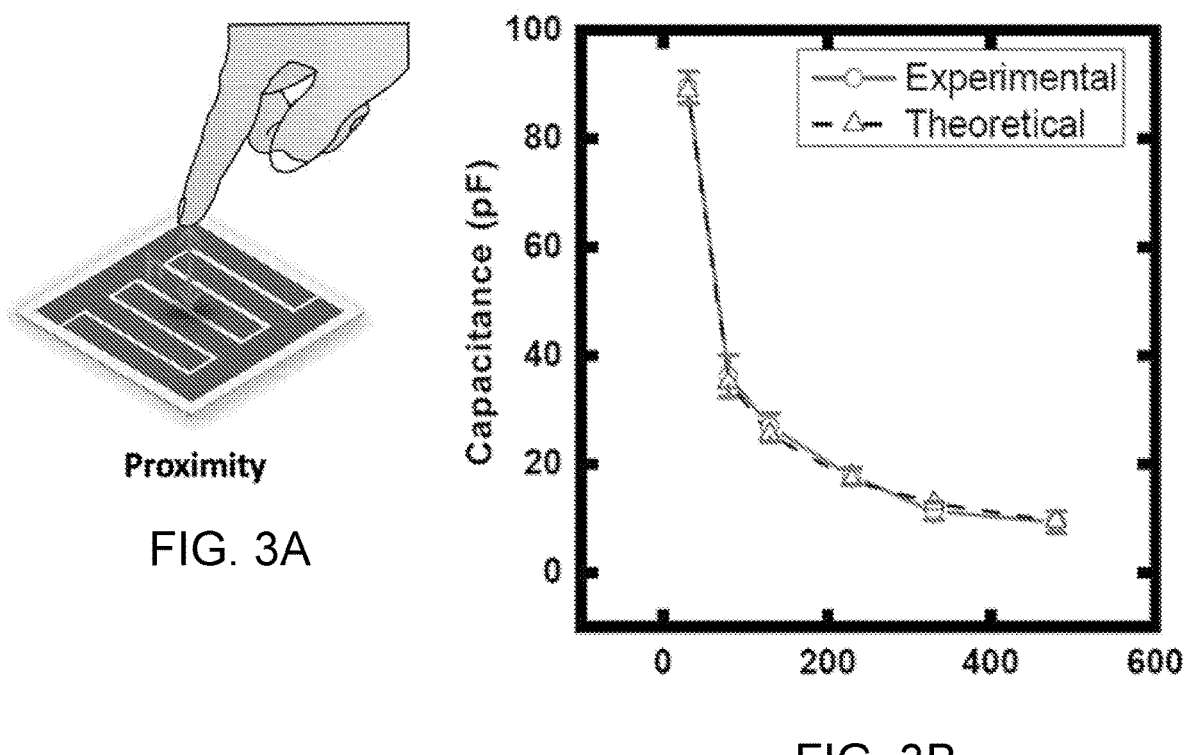
Proximity
FIG. 3A
FIG. 3B
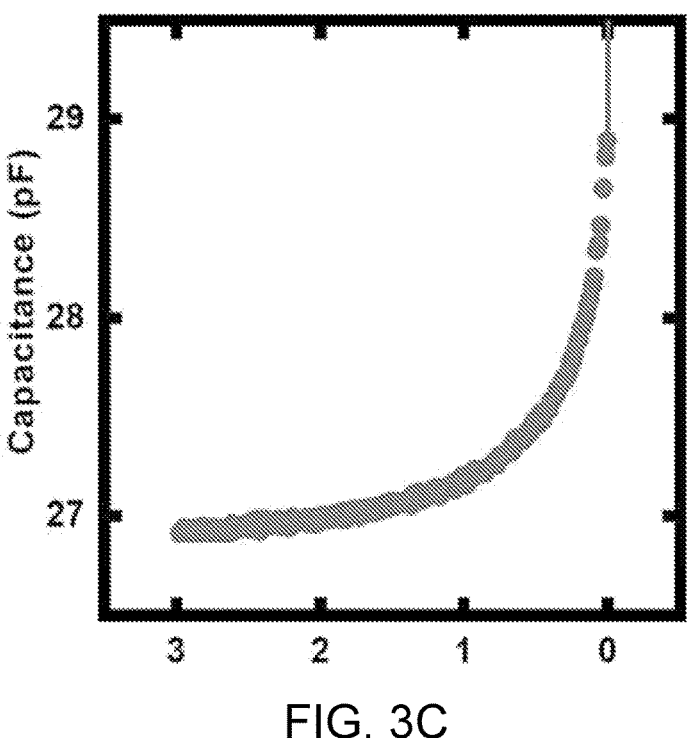
FIG. 3C

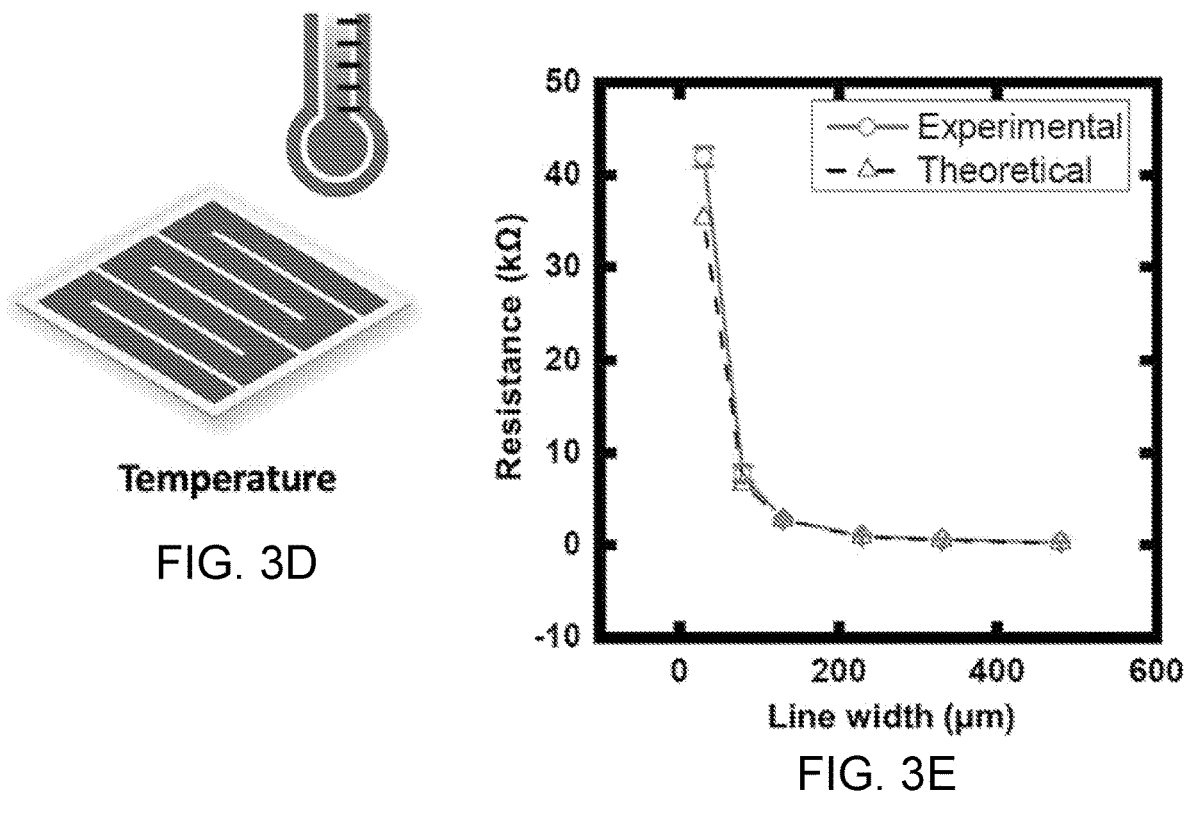
Temperature
FIG. 3D
FIG. 3E
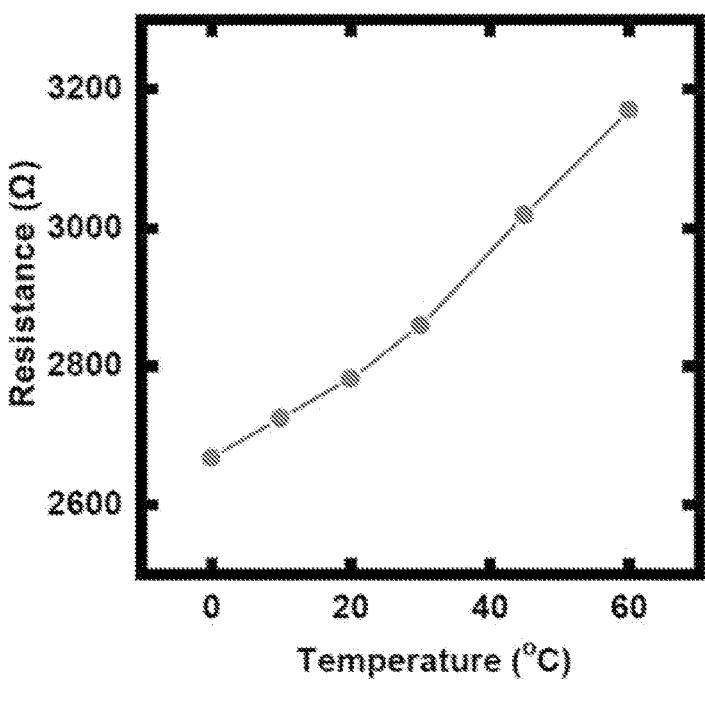
FIG. 3F (ii)                          (iii)

(ii)                          (iii)

A

B

DEVICES AND METHODS DIRECTED TO SENSING USING SYNTHETIC MATERIALS

BACKGROUND

Aspects of the present disclosure are related generally to the field of materials as may be used with sensors, for example, in connection with technologies such as soft robotics, and detecting environmental thresholds of touch-sensitive objects, and other sensing applications.

Using soft robotics as one of many example technologies which may benefit from sensor-based materials, it may be appreciated that soft robotics has emerged and advanced as a promising solution for industrial and medical applications. In particular, soft robotic hands have been demonstrated to grasp and even manipulate complex-shaped, fragile, or deformable objects, a perennial challenge for conventional rigid robotics. Despite their capabilities, the majority of soft robots are still unable to perform dexterous activities due to the lack of sensing ability for feedback control. Hence the emerging demonstration beyond simple passive actuation of soft robots has posed additional requirements on electronics in conformable interfacing with the soft and dynamic surface of robots with cutaneous sensing functionalities.

Recently, various efforts have been made with advantageous proposals for use in soft robotics applications but most are largely concerned with sensing the state of the robot itself such as sensing bending angles or internal pressure. Some of these proposals involve provision of contact or other cutaneous sensing with respect to interactions between robots and objects. For certain of these proposals and others, there has been the requirement of maintaining unaltered electrical performance under the large deformations caused by actuation which presents challenges on the integration of traditional sensing devices and discriminating strain from target stimuli. These challenges are especially prevalent as the wiring of several conventional sensors becomes complex.

Also, while there has been development of stretchable sensors for mounting on human skin, there have been obstacles in connection with such devices sensing contact phenomena via a robotic application and/or where there is required an integration of sensors with processing.

SUMMARY OF VARIOUS ASPECTS AND EXAMPLES

Various examples/embodiments presented by the present disclosure are directed to issues such as those addressed above and/or others which may become apparent from the following disclosure. In certain examples, various embodiments and aspects of the present disclosure are directed to apparatuses (e.g., systems, materials, and/or devices) and methods that involve stretchable membrane material integrated with a network of conductors/sensors. In one specific example, such an apparatus includes a stretchable synthetic membrane material and a series of patterned conductive or semiconductive sections which are electrically coupled to at least one sensor and are secured by the stretchable synthetic membrane material. The series of patterned conductive or semiconductive sections may include one or more bend nodes where adjoining ones of the sections meet.

In certain other examples which may also build on the above-discussed aspects, methods and semiconductor structures are directed to using and manufacturing such an apparatus which include the above-characterized stretchable synthetic membrane material and the series of patterned conductive or semiconductive sections. In a more particular example, the stretchable synthetic membrane material is provided with the series of patterned conductive or semiconductive sections being integrated in or against the material. One or more of these sections are electrically coupled to at least one sensor and secured or supported by one or more movable robotic digits, whereby the at least one sensor is able to be moved, relative to an external object, for sensing one or more of various environmental parameters as the object and the digit(s) approach one another. Depending on how the sensor(s) circuitry is configured, such parameters may include one or more of proximity, capacitance, temperature, impedance, contact with the object, and movement of the robotic member relative to the external object.

In yet another example embodiment, an apparatus includes a stretchable synthetic membrane material, at least one sensor to detect changes in capacitance, and a series of patterned conductive or semiconductive sections embedded in or secured against the stretchable synthetic membrane material. The series of patterned sections include a plurality of bend nodes adjoining ones of the sections with each bend node having an inner portion facing or directed inwardly and with one of the plurality of bend nodes being electrically and physically coupled to the at least one sensor. In one mode of operation, the stretchable synthetic membrane material may be stretched while the at least one sensor detects changes in capacitance associated with a difference in proximity between the at least one sensor and an external target object.

In another specific example according to the present disclosure, an apparatus includes a stretchable synthetic membrane material, at least one sensor to detect changes in capacitance, and a series of patterned conductive or semiconductive sections ("patterned sections") embedded in or secured against the stretchable synthetic membrane material. The patterned sections may include a plurality of bend nodes adjoining ones of the sections with each bend node having an inner portion facing or directed inwardly and with one of the plurality of bend nodes being electrically and physically coupled to the at least one sensor. In one or more modes of operation, the stretchable synthetic membrane material permits for being stretched (such as around a robotic digit or arm, a prosthetic or another base/housing device) while the at least one sensor detects changes in capacitance, temperature and/or proximity associated with an external target object.

In yet a further example embodiment, the present disclosure is directed to an apparatus for use with stretchable synthetic membrane material. In this example, the apparatus includes a series of patterned conductive or semiconductive sections embedded in or secured against the stretchable synthetic membrane material. The series of patterned conductive or semiconductive sections includes a plurality of bend nodes adjoining ones of the sections with each bend node having an inner portion facing or directed inwardly and with one of the plurality of bend nodes being electrically and physically coupled to at least one sensor that is configured to detect changes in capacitance. Further the stretchable synthetic membrane material is to be stretched while the at least one sensor detects changes in capacitance associated with a difference in proximity between the at least one sensor and an external target object.

The above discussion is not intended to describe each aspect, embodiment or every implementation of the present disclosure. The figures and detailed description that follow also exemplify various embodiments.

BRIEF DESCRIPTION OF FIGURES

Various example embodiments, including experimental examples, may be more completely understood in consideration of the following detailed description in connection with the accompanying drawings, each in accordance with the present disclosure, in which:

FIGS. 1A-1E are perspective views of an apparatus including a sensor network integrated with a base or housing implemented with at least one soft robotic digit, according to certain exemplary aspects of the present disclosure, with FIGS. 1A, 1B and 1C showing aspects of a cooperatively-controllable pair of soft robotic digits in one position, and FIGS. 1D and 1E being expanded views to illustrate arrangement and use of patterned interconnects;

FIGS. 3A-3C are views illustrating characteristics of an example sensor network having proximity sensing, according to certain exemplary aspects of the present disclosure;

FIGS. 3D-3F are views illustrating characteristics of an example sensor network having temperature sensing, according to certain exemplary aspects of the present disclosure;

FIGS. 6A-6B show performance-related aspects of example sensor networks having temperature sensing and proximity sensing capabilities;

FIGS. 7A-7C show performance-related aspects of example sensor networks used in food handling, for which the sensor networks have temperature sensing and proximity sensing capabilities;

Figure 1D:
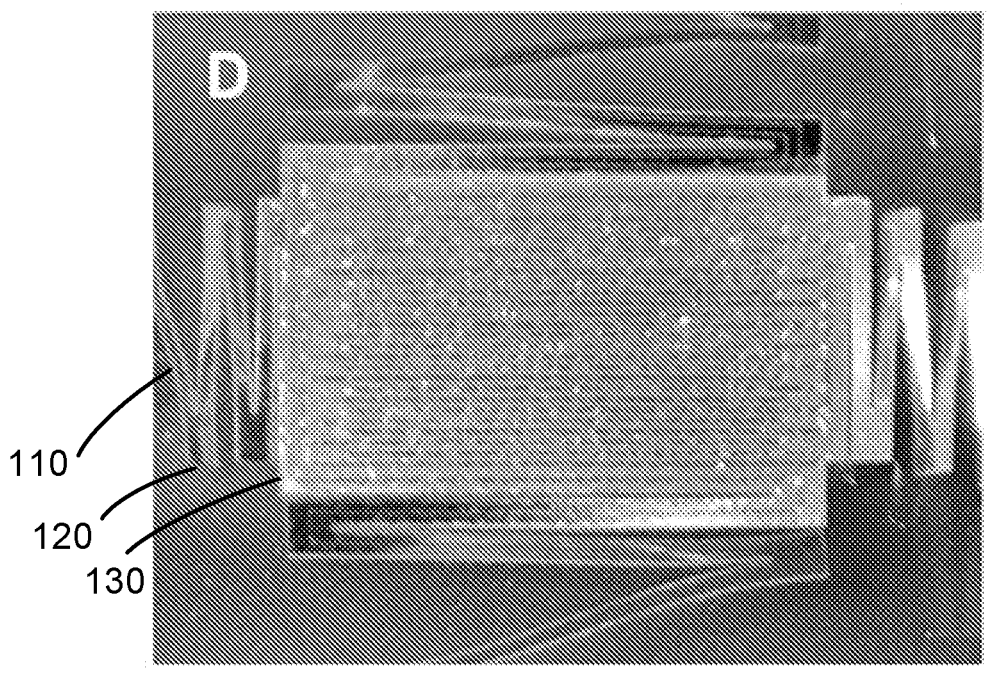

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving devices characterized at least in part by stretchable synthetic membrane material integrated with a series of patterned conductive or semiconductive sections (sometimes "conductors" or "interconnects"), where such sections are electrically coupled with sensors for sensing various environmental parameters, for example, as the material and an external object move relative to one another. While the present disclosure is not necessarily limited to such aspects, an understanding of specific examples in the following description may be understood from discussion in such specific contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same connotation and/or reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Certain more particular examples, which may also build on the above-discussed aspects, are directed to using and manufacturing such an apparatus which includes the above-characterized stretchable synthetic membrane material and series of patterned conductive or semiconductive sections. In one such specific example, the stretchable synthetic membrane material is provided with the series of patterned conductive or semiconductive sections being integrated in or against the material. One or multiple ones of these sections is electrically coupled to at least one sensor and, while the sections are integrated with the material, the material is secured or supported by a base structure such as one or more movable robotic digits. In use, as the material (including the at least one sensor) is moved relative to an external object, the surrounding environment may be sensed by the apparatus. Such sensing may be specific to one or more environmental parameters as the object and the material approaches one another. Depending on how the sensor(s) circuitry is configured, such parameters may include one or more of proximity, capacitance, temperature, impedance, contact with the object, and movement of the robotic member relative to the external object.

In example embodiment according to the present disclosure, an apparatus includes a stretchable synthetic membrane material, at least one sensor to detect changes in capacitance, and a series of patterned conductive or semiconductive sections ("patterned sections") embedded in or secured against the stretchable synthetic membrane material. The patterned sections may include a plurality of bend nodes adjoining ones of the sections with each bend node having an inner portion facing or directed inwardly and with one of the plurality of bend nodes being electrically and physically coupled to the at least one sensor. In one mode of operation, the stretchable synthetic membrane material may be stretched while the at least one sensor detects changes in capacitance associated with a difference in proximity between the at least one sensor and an external target object. In other modes of operation, the stretchable synthetic membrane material permits for such stretching while the at least one sensor detects changes in capacitance, temperature and/or proximity associated with an external target object.

In another specific example, the sensors and patterned sections are implemented in a network and are configured to sense one or more of the above parameters, and also to movement of the stretchable synthetic membrane material as it is stretched by the movement of the robotic digit(s), as the material is stretched around another object (e.g., another differ type of base or housing), and/or as the material is moved in preparation of a specific use.

In more specific examples related to the methodology for use and/or manufacture of such devices, a first step involves providing (e.g., presenting in an integrated manner) a series of patterned conductive or semiconductive sections electrically coupled to at least one sensor and secured by a stretchable synthetic membrane material. The series of sections, which may be associated with another step involving stretching, include one or more bend nodes adjoining each set of adjacent sections.

The above-characterized stretchable synthetic membrane material and series of patterned conductive or semiconductive sections may also be provided by patterning the conductive or semiconductive sections using 3D printing and/or laser ablation. Further, at least one pad may be formed in the stretchable synthetic membrane material, with the at least one pad being shaped to receive the at least one or more sensors. In various more specific examples, the stretchable synthetic membrane material is a thin conductive or semiconductive film on which the conductive or semiconductive sections are patterned using a laser beam (e.g., an ultraviolet or UV laser) at a sufficiently high operating power to remove, by ablation, sections of this thin film while the thin film is on the stretchable synthetic membrane material. The UV laser is operated at sufficiently high power so as to be below a level that significantly cuts through and thereby degrades a stretchability parameter of the stretchable synthetic membrane material. This threshold level may be discerned by trial testing, as a function of the stretchable synthetic membrane material chemistry and thickness.

Such aspects may be part of a manufacturing process and implemented for relatively low cost and with optimal customization. For example, these above-described steps of forming may be implemented using 3D printing and/or laser ablation, with such laser ablation involving removal of unwanted portions of the material by irradiating the surface with a laser beam. This may be achieved, for example, by heating the material and causing it to evaporate and/or sublimate. Further, by using computer-aided, subtractive manufacturing to facilitate customization in terms of stretchability and/or flexibility in connection with a process for automated manufacturing of the apparatuses, rapid and accessible manufacturing is realized and in some instances, is realized at scales relative to microlithography-based silicone devices.

In many of the above examples, the bend nodes may facilitate the series taking on a winding or switchback shape via the adjoining sections so that they are permitted to spread, significantly further away from the bend nodes, as the stretchable synthetic membrane material is stretched. Each of the one or more of the bend nodes may be shaped to form a wishbone shape with each bend node being the wishbone hub and with the adjoined ones of the sections corresponding to wishbone legs.

In certain examples, the stretchable synthetic membrane material and integrated series of pattern conductive or semiconductive sections are secured by a robotic digit, and one or more sensors detect an external object in response to movement of the robotic digit, or in response to at least one variable parameter associated with the object. As examples, the variable parameters may include one or a combination of: proximity, capacitance, temperature, contact of the object, and impedance.

When implemented via multiple sensors, various more specific examples are directed to the above-characterized apparatus having the material integrated with a sensor network wherein the bend nodes, and/or where certain of the adjoining conductive or semiconductive sections meet, are used as locations for the sensors in the network.

Accordingly, by stretching the stretchable synthetic membrane material along at least one (curved or planar) direction to fit the base or housing, the bend nodes facilitate the adjoined ones of the sections to separate at ends distal from the one or more bend nodes. This stretching permits for a transition to a (further) stretched mode by unfolding or separating at least partially, so as to permit the stretchable synthetic membrane material to stretch without straining the adjoined sections along length directions which define the respective adjoined sections.

Certain other related example aspects of the present disclosure are directed to a successful (e.g., experimental) demonstration of real-time stimuli distribution perception during soft robot interaction. This involves a soft robotic skin that consists of a sensor network covered by thin silicone rubber that is not only stretchable but also insensitive to strain with several sensors and impressive density metrics. The sensor network may be part of a sensing platform, providing multi-modality, which may have various sensors with capacitive or resistive responses. The multi-modality may be shown by analyzing a distance from approaching objects and temperature during soft robot interaction.

In more specific examples, these aspects/advantages may be realized by using a computer-aided design and processing for purposes of patterning the conductive traces and with Kirigami-like traces being built by flexible materials. This facilitates a tunable mechanical and electrical design that allows not only rapid low-cost fabrication but also easy customization. In more-specific examples, light from a UV laser is applied in connection with an ablation and cutting approach (e.g., UVLAC) on a thin conductive-coating film (e.g., a thin metal-coating film). In another example, the methodology involves patterning flexible electrodes with alignment holes, and conductive wire traced stretchable (e.g., Kirigami-like) wire to interconnect flexible and stretchable sensing devices in a single sensor network.

As may be applied, again by way of example, to the field of soft robots, aspects of the present disclosure may be directed to providing cutaneous sensing ability through the integration of sensing devices on the tensile and compressive surface. For these and other embodiments and applications, a stretchable and flexible sensor network with multi-modality delivers multiple sensing information (distance from an approaching object and temperature distribution) simultaneously and in real-time.

In certain other exemplary contexts, aspects of the present disclosure are directed to apparatuses and methodology for use and for manufacture of the apparatuses involving a network-based sensor being or having been laser machined for manipulation, for example, in terms of being stretchable and/or flexible.

In another example, the above-characterized material and series of sections involve patterning for formation of different (e.g., two or three) patterns for providing a thin metal layer and a plastic layer and, with laser beam information provided via software, such multi-layer patterns may be made in a single step without needing (or using) an alignment process. It may be appreciated that in other manufacturing processes, fabrication of multi-layer patterns may require such alignment processing.

In yet another specific example of the present disclosure, such methodology includes forming a flexible (e.g., Kirigami-like) sensor network via a minimal-step (e.g., one-step) laser-machined stretchable process, as may be useful for applications including, for example, soft robotics with cutaneous sensing ability. Patterning conductive traces and stretchable Kirigami interconnects on flexible material enables developing such robotic skin, including a stretchable and flexible Kirigami sensor network, that remains stable and functional under large strains. To realize the sensing device, a minimal- or one-step laser-machining is developed to take advantage of computer-aided easy customization and subtractive multi-layer machining in such a minimal step such as a one-step.

Consistent with the above examples and aspects, the present disclosure is further directed to using such examples and aspects in various other applications such as those which follow. (1) Soft robot interaction: demonstration of the sensor network on a soft robotic hand for tasks involving grasping cold and warm objects (e.g., a burrito) and for touching the forehead of a human. (2) Strain-insensitive performance: maintaining unchanged sensor behavior up to maximum strain on the surface of the robotic finger (e.g., 12%). Analyzing temperature and proximity contact actuation repeatedly and accordingly, without causing any negative influences on device performance or yield (0.026% signal change during 30 times soft robotic actuation). (3) Higher mechanical robustness: unchanged electrical characteristics (1%) under stretching from less than 100% and up to 7000% strain, from Kirigami interconnects that wires sensor arrays to multiplexing circuit. (4) Multi-modality: with the different patterns on device areas, capacitive and resistive sensing platform for a proximity sensor (e.g., 2 pF over 3 to 0 mm) and temperature sensor (e.g., 600Ω over 0 to 60° C.) that can realize complex functionalities of robotic skin electronics. (5) Computer-aided fabrication, not involving microlithography or complex chemistry. Low fabrication complexity and material cost (e.g., a couple U.S. dollars per square meter) may also be realized. Moreover, by varying the cutting program of a UV laser, manufacturing is easily customized and scaled for different form factors and applications having differing ranges of sensed variables for specific applications.)

Uses for the sensor network may include, but are not limited to, food handling, human-robot interaction and related applications involving soft robotic devices. In one or more of these applications, proximity sensing is useful to maintain gentle contact, while temperature sensors can distinguish between warm or cold food and between an elevated or normal skin temperature. Additional aspects, uses and/or embodiments may include additional sensor types; for example, strain gages fabricated in situ for proprioceptive sensing. The addition of an XY stage or feed rollers for the film allows the laser to pattern and cut much larger areas. For example, an array of 10×20 sensors and interconnects, initially occupying 155 mm×200 mm in the unexpanded state, can be expanded to cover 520×1640 mm of the surface of a soft robotic arm or appendage.

In connection with the above-described embodiments, other example aspects have also been demonstrated using a temperature-sensing sensor network-integrated soft robotic hand. The temperature distribution may be mapped while the hand is approaching, touching, grasping, and moving water containing aluminum bottles. For example, relative resistance changes to eight temperature sensors are measured simultaneously while the hand makes contact with the cold or hot bottle. These demonstrations also include food handling by sensing multi-modal stimuli distribution through proximity and temperature sensor network-integrated soft robotic finger. The finger is approaching, touching, and releasing an aluminum foil which enclosed a warm burrito, while mapping proximity and temperature distribution as the change in capacitance and resistance of eight sensors increased during the contact.

In other such demonstrations, human-soft robot-interaction is shown by sensing multi-modal stimuli distribution, such as proximity and temperature. The robotic finger is approaching, touching, and releasing a fevered silicone-skin-covered baby doll, while mapping proximity and temperature distribution when the finger is touching the fevered baby doll as the change in capacitance and resistance of eight sensors increased during the contact. Accordingly, with an integration of actuation-independent sensor network on the soft robotic hand, there are ignorable resistance changes on all eight sensors during two cycles of open actuation during the time change.

Consistent with the above aspects, such a manufactured device or method of such manufacture may involve aspects presented and claimed in U.S. Provisional Application Ser. No. 63/077,043 filed on Sep. 11, 2020 to which priority is claimed. To the extent permitted, such subject matter is incorporated by reference in its entirety generally and to the extent that further aspects and examples (such as experimental and/or more-detailed embodiments) may be useful to supplement and/or clarify.

Experimental/More-Detailed Example Embodiments

In connection with the present disclosure, it has been discovered that with interconnects and sensors configured in a network, the network may be stretched without substantially affecting the abilities of the sensors and interconnects (e.g., by measuring impedance change to each external stimulus and showing sensor readings). With the sensor sheet wrapped around a soft robotic gripper, several different interaction scenarios may be demonstrated, including identifying hot and cold water bottles, a warm burrito for food handling, and a warm baby doll for future medical applications. To improve the sensing abilities of soft robotic hands using low-cost, stretchable Kirigami sensor networks, experimental aspects are directed to creation of such networks by using an ultraviolet laser to ablate and cut patterns on metalized plastic film. Different kinds of sensors allow a soft robotic hand to detect contact, proximity, changes in temperature, and strain. The sensors and their arrangement are readily customized for different applications. In connection with the below discussion, experimental design, fabrication methods, and results of characterization tests are presented based on prototype testing conducted with such sensors as above. Further, a stretchable network integrated with a soft robotic hand is presented based on experimental demonstrations, and featuring thermal and proximity sensing for applications that include a wide range of uses such as the above-noted gripping, sensing and/or touching uses.

In particular, such experimentation addresses mismatch issues, in terms of mechanical properties, involving integration of traditional sensors on soft robots and/or prosthetics. For example, many conventional sensors are rigid, but the surfaces of soft robots need to stretch and are curved. Therefore, certain sensors and networks exemplified according to examples of the present disclosure use stretchable and flexible form factors to conform to and move with soft surfaces, without unwanted strain effects in the sensor signal. Moreover, certain of these exemplified sensors and networks need not involve or require microlithography or complex chemistry, but rather they may have a low fabrication complexity and material cost. For example, by varying beam parameters and patterns on the program of a UV laser, such apparatuses and related methodology according to examples of the present disclosure may be readily customized and scaled for different form factors and applications with differing ranges of sensed variables.

The following sections describe an example fabrication process and present characterization tests for such sensors and networks according to certain aspects of the present disclosure. For the sake of simplicity, unless otherwise noted, the following discussion refers to the same example embodiment.

Turning now to the figures, FIGS. 1A-1E are perspective views of an apparatus, implemented according to one example of the present disclosure, including a sensor network integrated with a base or housing and implemented with at least one soft robotic digit. As with the other figures and aspects included in the present disclosure, each of FIGS. 1A-1E may pertain to the same example embodiment or different aspects useful for implementation of alternative sensor networks.

Each of FIGS. 1A, 1B and 1C show a cooperatively-controllable pair of soft robotic digits in one position. Not shown in the figures are servo motors (e.g., motorized vertical translators) and/or a controller (e.g., a programmed microcomputer or other logic circuit) for directing movement of the robotic digits, with large bend deflections, to grip an object between the ends (or anywhere along the inner surface of the digits as in FIG. 1B), and/or to separate an object (or a set of objects) using pressure from digits as in FIG. 1C. The controller may also receive, via wires connected to the sensors, feedback (e.g., sensed temperatures, sensed proximity to another sensor or to an object such as by a sensed change in capacitance, etc.). In such contexts, FIG. 1B shows the soft robotic digits in one position and FIG. 1C shows the soft robotic digits in another position.

FIG. 1D shows a magnified view of a series of patterned interconnects 110, with bend portions or nodes 120, with the series of patterned interconnects being coupled to an exemplary thermal sensor (as depicted in the square-like center portion 130 of FIG. 1D). In one of various examples herein, as magnified in the image, the thermal sensor of FIG. 1D may correspond to a thermal sensing unit having traces which are, viewing horizontally in FIG. 1D, from 10 $\mu$m-350 $\mu$m in width by 200-450 mm in length and in increasingly more particular example embodiments, 130 $\mu$m-180 $\mu$m wide traces×300 mm-380 mm trace length, and 130 $\mu$m wide traces (plus/minus 10%)×330 mm trace length (plus/minus 10%). With regards to the stretchable interconnects 110, in any of these various examples, they may be 40-450 $\mu$m wide traces×15-60 mm trace length. In one such particular example, the stretchable interconnects 110 have the following dimensions: 40-250 $\mu$m wide traces×25 mm-35 mm (e.g., about 30 mm) trace length, and thermal sensing unit has traces which are 125-135 $\mu$m wide×310 mm-350 mm (e.g., about 330 mm) in length.

Figure 1E:
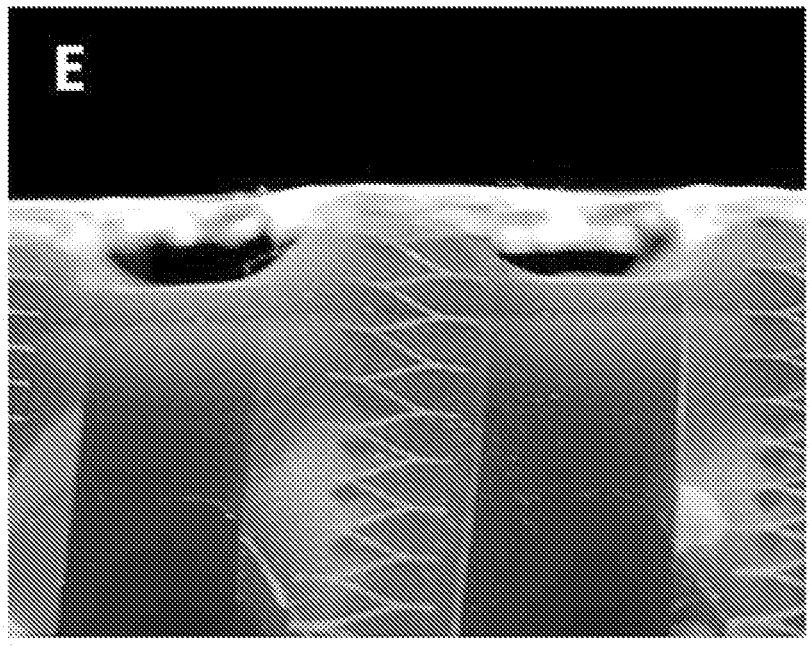

FIG. 1E shows interconnects embedded, as another example for implementation, in a silicon skin. Once embedded, the silicon skin may be stretched around of one or both of the soft robotic digits before use of soft robotic digit(s). More particularly, the soft robotic digits are shown to include patterned interconnects which may be Kirigami patterned (e.g., into a winding shape) by a laser or three-dimensional printer to form a sensor network including multiple circuit-based sensors (or "sensing unit" as shown in FIG. 1D).

In connection with FIGS. 1B and 1C, a particular example embodiment is directed to multi-modal sensing via soft robotic skin on a pair of robotic digits (or as secured to another such structure as a different type of base or housing). In this particular example embodiment and sensing approach, a metalized PET (Polyethylene Terephthalate) film, which is used as the robotic skin, is patterned by UV laser ablation and cutting. The PET material may the same as commonly used for reflective window films and helium party balloons. By controlling the power of the UV laser, the sensor patterns may be created and the interconnects/traces (e.g., metal) can be ablated without damaging the plastic beneath, and then the film may be cut to create highly stretchable interconnects. A robotic skin, consisting of sensors connected by Kirigami wire traces, may be accordingly fabricated, expanded and embedded in soft and stretchable silicone rubber as exemplified by FIG. 1A. As noted above, the skin may be stretched and wrapped around the soft fingers (e.g., plastic or other material) to keep it attached without wrinkles as the fingers flex and extend as exemplified by the positioning shown in FIGS. 1B and 1C.

In one such specific example as shown in FIG. 1A, a multi-modal sensor network includes four temperature sensors and four proximity sensors with interconnects that provide eight signals and two ground wires routed to the backs of the fingers. The sensors occupy discrete pads (one of which is highlighted by 130 of FIG. 1D) that are flexible but not locally stretchable. Stretching occurs in the winding-shaped series of interconnects (FIG. 1E), which can expand without substantially affecting sensor readings. The patterned connectors can contain multiple conductive traces, which is useful for connecting multiple sensors to an analog-to-digital converter (ADC) which in turn may be coupled to a controller.

Figures 2A, 2B, 2C:
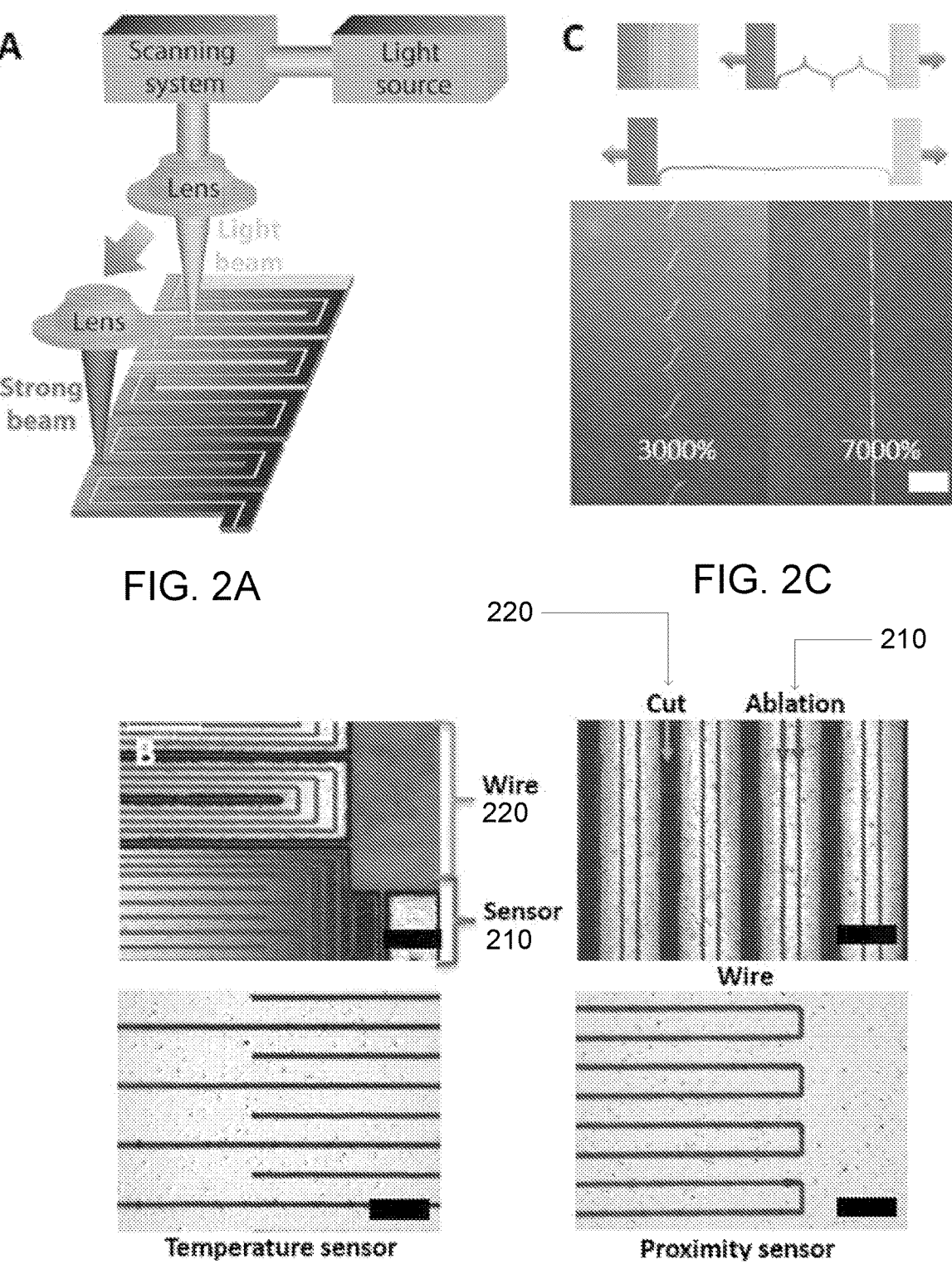
FIGS. 2A-2E are views illustrating characteristics of an example sensor network, according to certain exemplary aspects of the present disclosure.
Figure 2D:
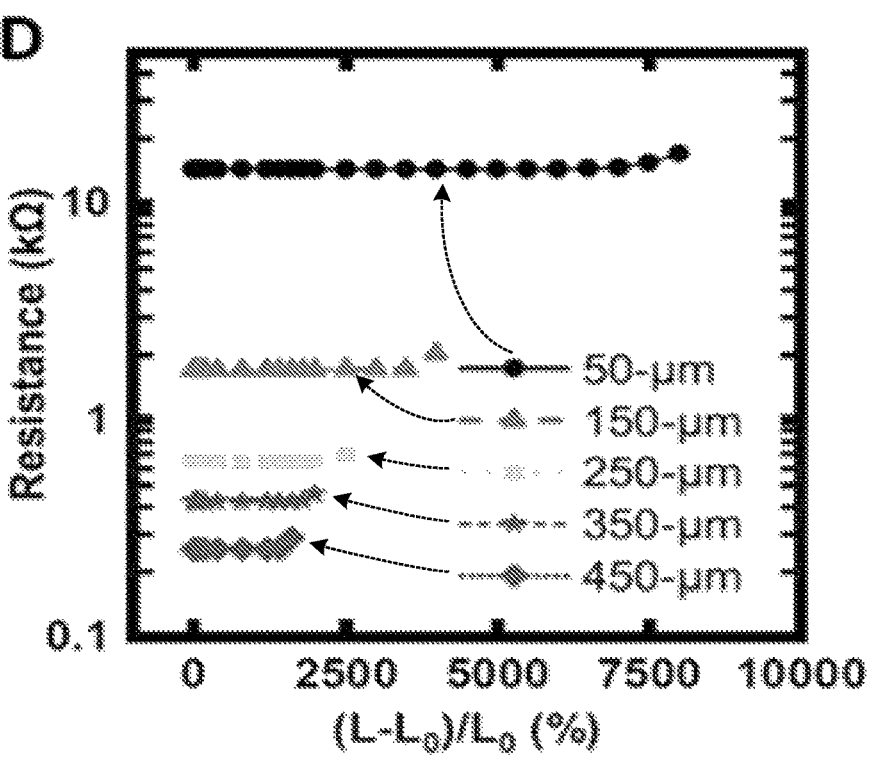
Figure 2E:
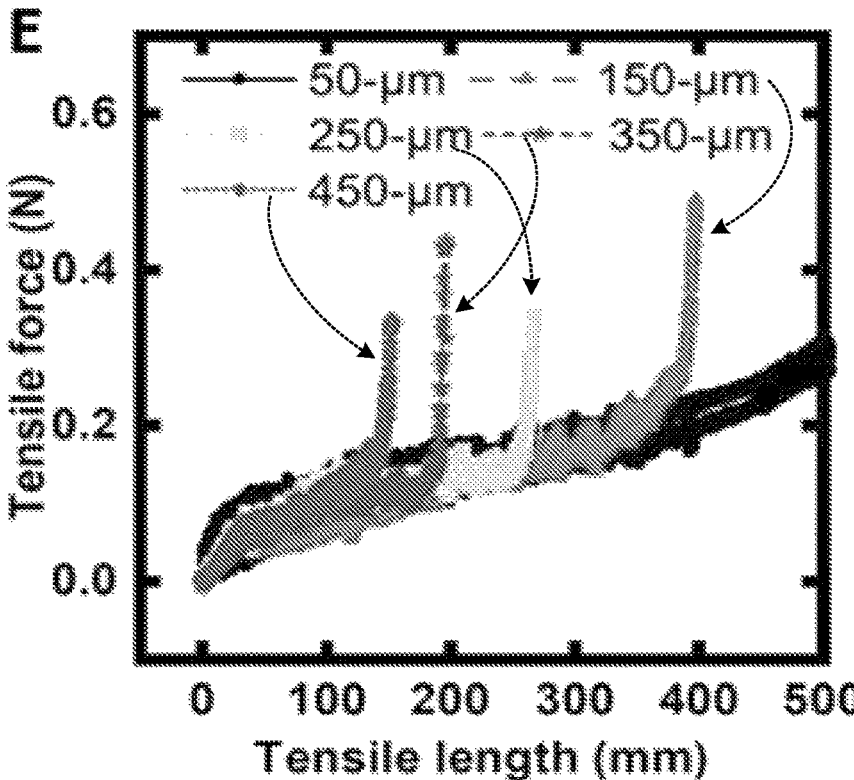

FIGS. 2A-2E are views illustrating characteristics of an example sensor network, according to certain aspects of the present disclosure. FIG. 2A illustrates an example laser ablation strategy, using low power to pattern the metal traces and higher power to cut the PET (Polyethylene Terephthalate) film. FIG. 2B illustrates microscopic images of sensors 210 and wires (e.g., interconnects) 220 showing ablated aluminum sensors and cut interconnect wires. Heavy black bars show a 300 $\mu$m length scale used for this particular example. FIG. 2C illustrates diagrams and images showing Kirigami interconnect stretching, while FIG. 2D illustrates electrical properties and FIG. 2E illustrates mechanical properties of stretchable interconnects with different wire widths (traces fill the entire film width).

In terms of fabrication of a sensing network such as shown in FIGS. 2A-2E and with reference to the above-referenced provisional patent document, ultraviolet lasers may be used for cutting and patterning the thin films whether such thin films include plastics, metals, and/or composites (as described). A diode UV laser (e.g., 2.66 W, 354.7 nm, DPSS Laser Inc.) may be used for creating the sensors and cutting the film in a single setting (FIG. 2A). For the example network shown here, the fabrication may begin by providing readily available sheets which, in some instances may be of the same or similar thicknesses (e.g., 50 $\mu$m thick clear PET (Polyethylene Terephthalate) film with 50 $\mu$m thick reflective aluminum coating). In another example, the PET film and the reflective aluminum coating have similar thicknesses in that each is less than 150 $\mu$m thick and each falls within a thickness range of 10%-25% of the other. In a specific example parametric study involving this fabrication example, over a range of laser settings was used to make the traces as thin as possible, while also ensuring complete removal of metal from gaps between traces and preventing damage to the underlying film. From this effort, the following optimized patterning results were obtained having the following settings: a single pass at 100% of the rated power of 2.66 W, with a scan rate of 2000 mm/s, and a frequency of 60 kHz. Under these conditions, the minimum trace width is 30 μm, and the minimum gap width between traces is 20 μm. For different metals (e.g., copper) and film thicknesses, these settings and dimensions may change.

Next, a Kirigami structure is provided. In one such example, after patterning, the film is cut to create the Kirigami structure. After testing various cutting parameters to achieve clean cutting without carbonized edges that could produce shorting, the best results were obtained with the following settings: a seven times pass at 100% of the rated power of 2.66 W, with a scan rate of 150 mm/s, and frequency of 30 kHz. For different plastics (e.g., polyimide) and film thicknesses, these settings may change. With these settings, it is possible to cut strips as thin as 50 μm (removal width of 50 μm) with aluminum traces as thin as 30 μm wide (removal width of 20 μm). FIG. 2B shows four sequential segments of a typical interconnect before expansion. The segments are 350 μm wide, and separated 50 μm gaps cut through the PET layer to create parallel strips. On each strip are three parallel conductive traces with 20 μm gaps of ablated aluminum.

As a next (e.g., final step), the stretched network is embedded in a soft and stretchable skin (e.g., PDMS (Sylgard 184) cast to a thickness of 58 μm). The silicone can stretch by an additional 100% after it cures. Advantageously, the fabrication process for creating the sensor network is fast and inexpensive (e.g., with such inexpensive film and the film taking about three minutes to fabricate). Each sensing apparatus (e.g., with sensing units implemented to fully occupy pads as at 130 of FIG. 1D) and interconnects in an unexpanded configuration may be sized in a shape of less than 100 mm width by 100 mm length (e.g., 50 mm×50 mm sensor, with each of width and length being plus or minus 20%). Adding a horizontal stage or feeding rollers to the laser allows larger areas to be fabricated in a single setup.

FIG. 2C shows schematically how the interconnects may be stretched, with one example as shown having the degree of interconnects stretching 30× and 70×. It is noted that the above-identified UV laser beam has a circular focal pattern that makes rounded edges when cutting the illustrated winding patterns, which may be beneficial for stress distribution and mitigation of cracking where the interconnects turn at each bend node. In a more particular example built for the sake of simplicity, sensors and interconnects are created in a tiled pattern with 10×10 mm regions interspersed with 10×10 mm interconnects. For a given 10×10 mm initial area of film, the design of the interconnect(s) involves a tradeoff (FIG. 2D). In essence, patterns for thin traces (50 μm wide interconnect with 50 μm wide conductive trace) have higher resistance, but can also stretch further before becoming taut, at which point the resistance starts to change. The trace resistance may be given by equation 1 as follows:

$$R = \frac{\rho L}{A} \qquad \text{(Eqtn. 1)}$$

In this simplified example, initial resistances of the 50, 150, 250, 350, and 450 μm traces are 14.4, 3.4, 1.3, 0.85, and 0.51 kΩ (standard deviation of ±2 to 10%), respectively. The thinnest trace also shows the least change in resistance for stretching up to 70× because it undergoes the least material strain at the corners as the interconnect expands and straightens (see FIG. 2C). For the 50 μm traces, the change in resistance is approximately 1%, when the interconnect is stretched 70×; less than 17% for 80× of stretch. The resistance changes of the 150, 250, 350, and 450 μm wide Kirigami interconnects remain below 1% at strains of 3500%, 2000%, 1600%, and 1400%, respectively.

FIG. 2E shows the force/extension behavior of the interconnects during stretching. All the interconnect patterns have relatively low stiffness (approximately 0.1 N/0.4 m) until they become taut.

FIGS. 3A-3F show characteristics of proximity and temperature sensors of one such above-described example sensor network, with FIGS. 3A-3C illustrating characteristics of an example sensor network having proximity sensing, according to certain exemplary aspects of the present disclosure, and FIGS. 3D-3F illustrating characteristics of an example sensor network having temperature sensing. In FIG. 3A, the proximity sensor is made of interdigitated comb patterns of aluminum on PET film. FIG. 3B shows sensing resolution and range are tunable by initial capacitance, which depends on the number and dimensions of the traces; results match numerical simulations in modeling software, such as COMSOL. FIG. 3C shows distance from an approaching object (<3 mm) as measured by the change of fringing capacitance. FIG. 3D shows the temperature sensor is made of a meandering pattern with a 60,000:1 length: width ratio. FIG. 3E shows temperature sensing resolution and range vary with initial resistance that depends on trace width and length; results match the theoretical calculation. FIG. 3F shows temperature from 0 to 60° C. is measured by resistance, which changes approximately linearly with temperature.

The proximity sensor is made by patterning two interdigitated comb electrodes (e.g., as in FIG. 3A). The fringe field generated between electrodes changes as a conductive object (e.g., a human finger or metal rod) approaches the sensor. Range and resolution of the sensor are tunable by the width and length of the pattern:

$$\frac{C}{L} = \varepsilon \left[ \frac{t}{h} + \frac{\pi\left(1 - 0.0543\frac{W}{2h}\right)}{\ln\left(1 + \frac{2h}{W} + \sqrt{\frac{2h}{W}\left(\frac{2h}{W} + 2\right)}\right)} + 1.47 \right] \qquad \text{(Eqtn. 2)}$$

where C is fringe capacitance, and ε is the dielectric constant. The width (W) of the electrode is adjustable, the thickness (t) is 50 nm, and the gap (h) is 20 μm, set by manufacturing limitations. If the comb electrodes are thinner and denser in designated sensor areas, a larger initial capacitance is obtained, which increases sensitivity (FIG. 3B). For the sensor network, a 130 μm wide comb pattern is chosen since it has less than 10% variation in line width due to manufacturing tolerances. Finite element simulation of the fringe capacitance for approaching objects was conducted using COMSOL Multiphysics® and showed that a 130 μm wide trace pattern with 20 μm gaps should have an initial capacitance of 1.85 pF for an object that is 3 mm distant. As the object draws closer, the capacitance increases by approximately 2 pF as the gap approaches zero.

The temperature sensor may be made by patterning a meandering trace (FIG. 3D). Since aluminum is a thermoresistive metal, its resistance increases with temperature:

$$R = R_0[1 + \alpha(T - T_0)] \qquad \text{(Eqtn. 3)}$$

where α is the TCR (Temperature Coefficient of Resistance) of the material used as the electrode, is the initial resistance at the reference temperature, =0° C., and is the resistance at temperature T. Range and resolution of the sensor are tunable by the width and length of the pattern:

$$\text{Sensitivity} = \frac{(R - R_0)}{(T - T_0)} = \alpha R_0 \qquad \text{(Eqtn. 4)}$$

Sensors with a thinner and longer pattern have a larger initial resistance and higher sensitivity, as seen in FIG. 3E; theoretical and empirical results match within 7%. For the sensor network, 130 μm wide meandering wire pattern is chosen from theoretical analysis. Given the resistance and change in resistance, a 130 μm wide trace with a 20 μm gap meandering electrode can detect 0.1° C. When the fabricated sensor is placed in an oven, the resistance of 130 μm wide trace increases almost linearly with temperature over a range from 0 to 60° C. (FIG. 3F). Thus, there is approximately 600Ω resistance difference over 0 to 60° C. Fitting a curve defined by Equation (3) to the data results in a measured TCR of $3.14 \times 10^{-3}$, which is comparable to the reported TCR of aluminum ($3.9 \times 10^{-3}$), some difference is expected, given the very thin aluminum layer on PET film.

Figure 4A:
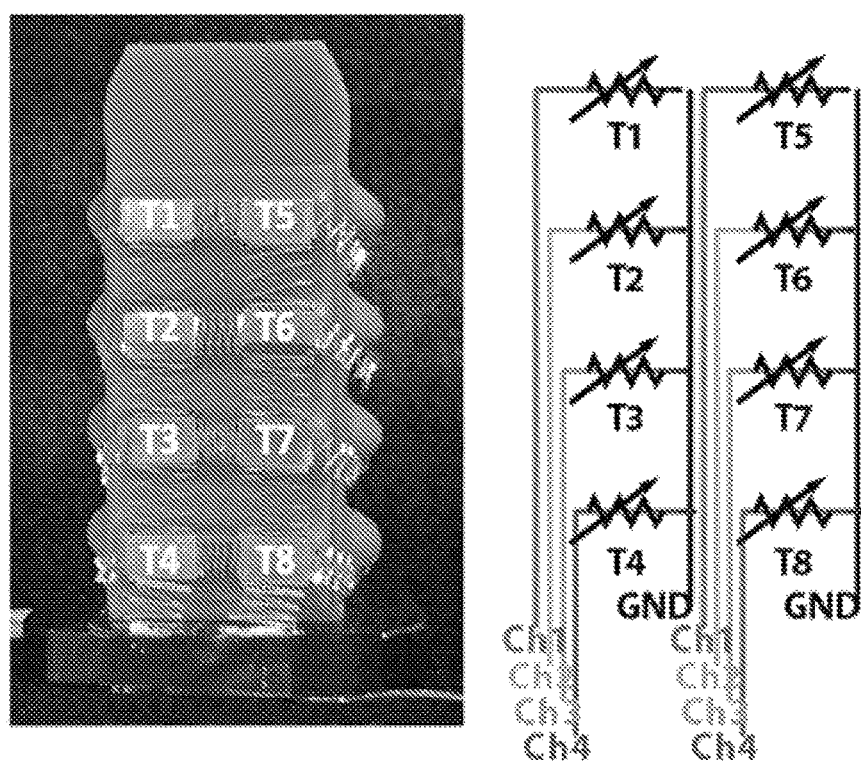
FIGS. 4A-4B show circuit-related aspects of example sensor networks having temperature sensing and proximity sensing, respectively.
Figure 4B:
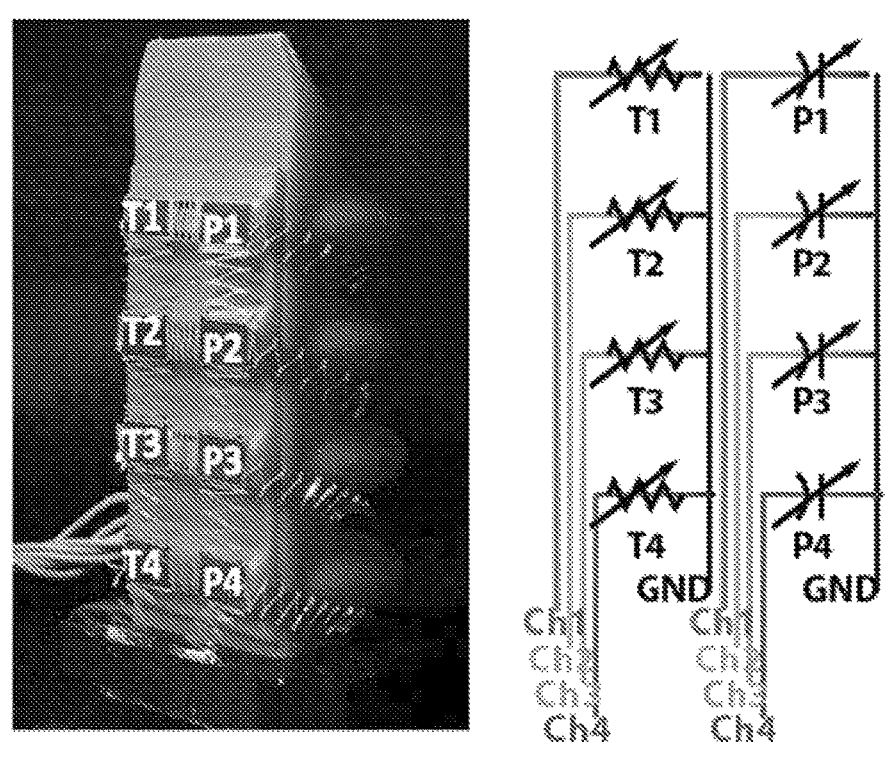

FIGS. 4A-4D show integration of an actuation-independent sensor network on the soft robotic hand, with FIGS. 4A-4B showing circuit-related aspects of example sensor networks having temperature sensing and proximity sensing, respectively. FIG. 4A shows sensor network integration on the soft robotic fingers (left). The network includes eight temperature sensors (T1-T8) with 130 μm-wide traces, connected by 350 μm cut interconnects with 1-5 traces (350 mm to 50 μm wide per electrical path). FIG. 4B shows image and circuit diagrams for the multimodal network of temperature and proximity sensors. Interconnects are alike in each of FIGS. 4A and 4B. Measured resistance chance is small when opening and closing the fingers.

In connection with the illustration of FIGS. 4A-4B, such networks may also be used with temperature sensors, proximity sensors, and/or temperature and proximity sensors (each such sensor type being mountable on robotic fingertips such as by Soft Robotics Inc.). The interconnects may be routed to the back of the robotic hand and connected using conductive silver epoxy (Chemtronics CW2400) to wires and an analog to digital converter. Preferably-sized sensors (e.g., 5×10 mm sensors) may be mounted using soft, 1 mm thick VHB tape (3M) to ridges on the insides of the fingers where contact generally occurs. These ridges undergo somewhat less strain than other parts of the fingers. As for whether the temperature sensors, which are also strain sensitive, are affected by opening and closing the fingers, it has been shown that the sensor readings change little (e.g., 0.024% and 0.026%. respectively) over two successive opening and closing cycles.

Figure 5A:
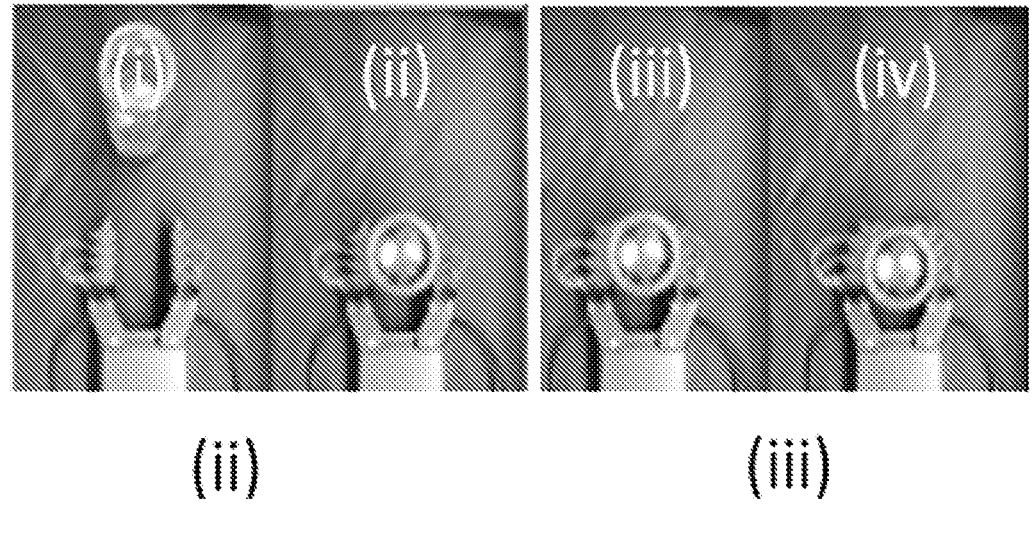
FIGS. 5A-5D show soft-robotic digits controlled with gripping-related aspects and with sensor networks having temperature-sensing and/or proximity-sensing capabilities.
Figure 5B:
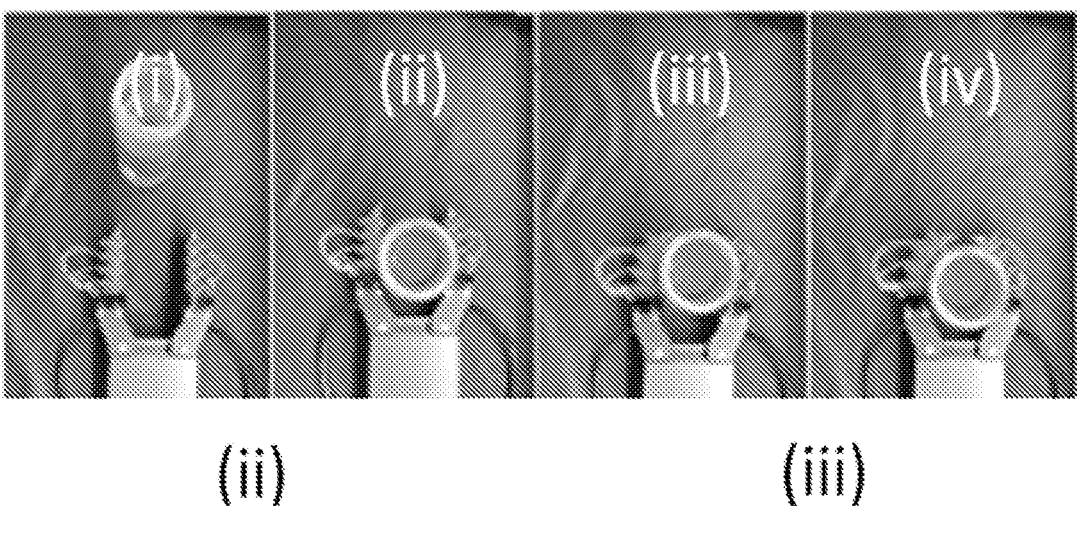
Figure 5C:
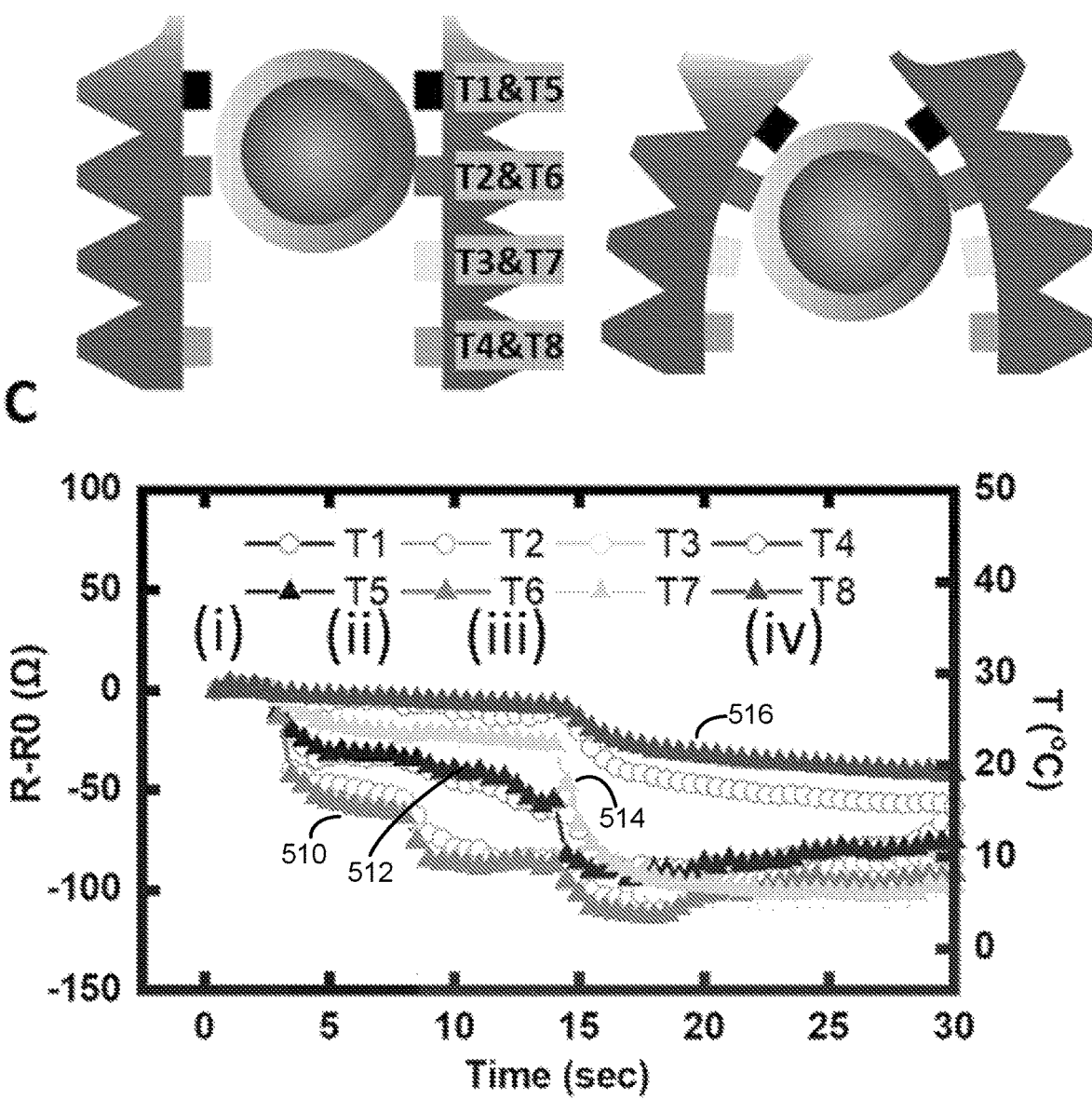
Figure 5D:
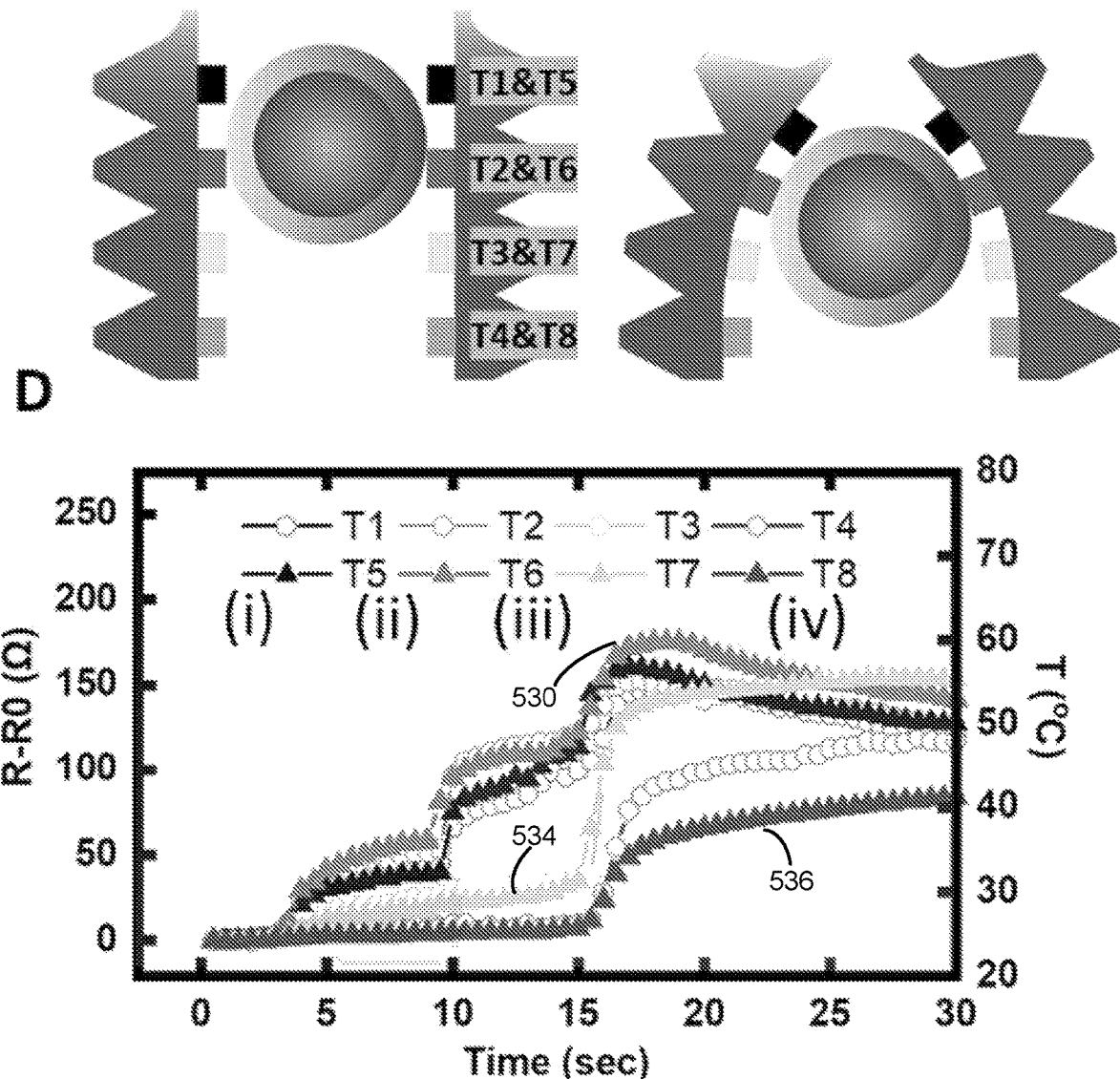

FIGS. 5A-5D show soft-robotic digits controlled with gripping-related aspects and with sensor networks having temperature-sensing and/or proximity-sensing capabilities, for showing contact temperature sensing for cool and warm objects. In FIG. 5A, the shown images depict: (i) approaching, (ii) touching, (iii) grasping, and (iv) carrying a cool (5.5° C.) aluminum bottle filled with water. Diagrams (ii) and (iii) show which sensors are in contact for the corresponding phases. FIG. 5C shows the corresponding sensor readings. FIGS. 5B and 5D show the same sequence as FIGS. 5A and 5C but with a hot water bottle (55.7° C.). For the lined plots of FIGS. 5C and 5D: in FIG. 5C, plot line 510 corresponds to temperature sensors T2 and T6, plot line 512 corresponds to temperature sensors T1 and T5, plot line 514 corresponds to temperature sensors T3 and T7, plot line 516 corresponds to temperature sensors T4 and T8; and in FIG. 5D, plot line 530 corresponds to temperature sensors T2 and T6, plot line 534 corresponds to temperature sensors T3 and T7, and plot line 536 corresponds to temperature sensors T4 and T8.

For grasping warm and cool objects, an infrared (IR) thermometer may be used to detect the temperature of a target object. However, it has been shown that IR thermometer detection is dependent on the emissivity of the material; for example, the emissivity is 1.2 for aluminum and only 0.1 for water. In such experimental efforts according to the present disclosure, and wherein the target object is a bottle, relevant temperatures as measured by an IR thermometer may not be reliable, because the measured temperatures at the top and side surfaces of the bottle may be different. Direct contact temperature sensing can be a more reliable alternative in some applications. FIGS. 5A-5D also show how the contact sensors respond during acquiring, grasping, and moving cool and warm aluminum water bottles. During the approach, the eight sensors all show a reading of (24.9° C.). The pair T2 and T6 are closest to the maximum bottle surface and initially have the largest contact areas, so they respond quickly. Subsequently, as the fingers continue to close, the other sensors that are in contact (T3, T7) approach the same temperature, while the proximal sensors (T4, T8) show a small increase in temperature. As a result, the measured temperature is 5.48° C., as compared to the temperature (5.5° C.) measured with a thermometer immersed in the water. The results with a hot water bottle are similar. The measured temperature with the gripper is 55.2° C., while the actual temperature is 55.7° C.

Figures 6A, 7A:
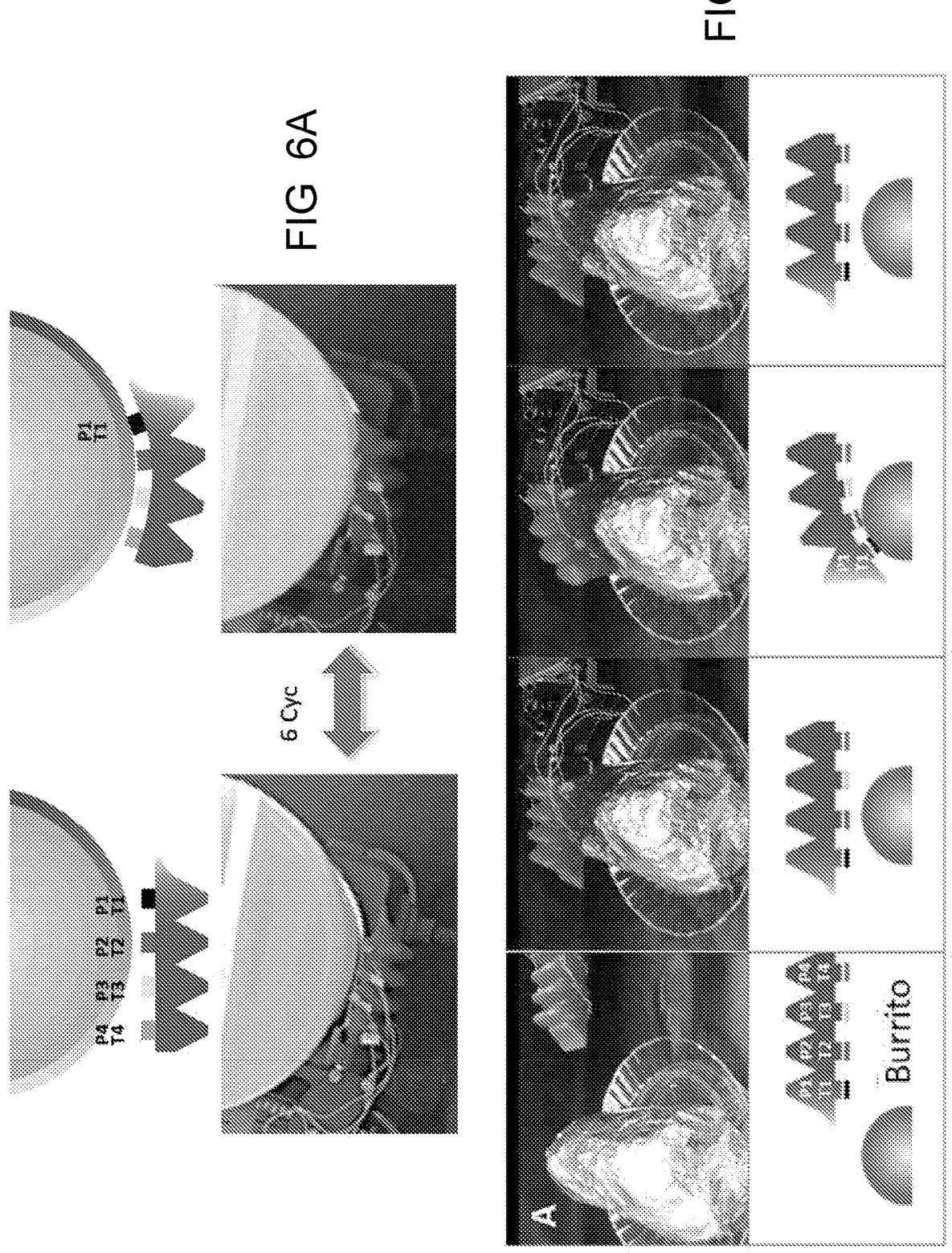

FIG. 6A shows, in connection with repeatability testing of one or more of the above-described types of sensor network, and performance-related aspects of the example sensor network having temperature sensing and proximity sensing capabilities. FIG. 6A shows schematics and images of a robotic finger with temperature (T1-T4) and proximity (P1-P4) sensors for six cycles of contact and finger actuation. The target object is a cylindrical jar filled with 38.0° C. water. Testing associated with FIG. 6A shows proximity distribution measurement and temperature distribution measurement over six actuation cycles. Accordingly, FIG. 6A and related testing may be used to illustrate the degree of repeatability to be expected for contact temperature and proximity sensors over multiple actuation cycles. The figures show the results as the finger contacts and conform six times to a glass jar filled with warm water. Sensors P1 and P2, and corresponding temperature sensors T1 and T2, make contact with the jar and therefore show a much larger response than the other sensors. The measured temperature from the network is 38° C., which is close to the water temperature of 39° C.

The above results may be utilized in other applications, such as involving prepared food handling. In this example application, the sensor network may be used to enable the grasping of a warm or cool burrito wrapped in foil. In this application (see discussion of FIG. 7A which follows), the proximity sensors are useful to ensure firm contact without excessive pressure, and the temperature sensors are useful to monitor the temperature. Because the burrito is wrapped in foil, an optical thermometer does not give a reliable temperature reading.)

Figures 7B, 7C:
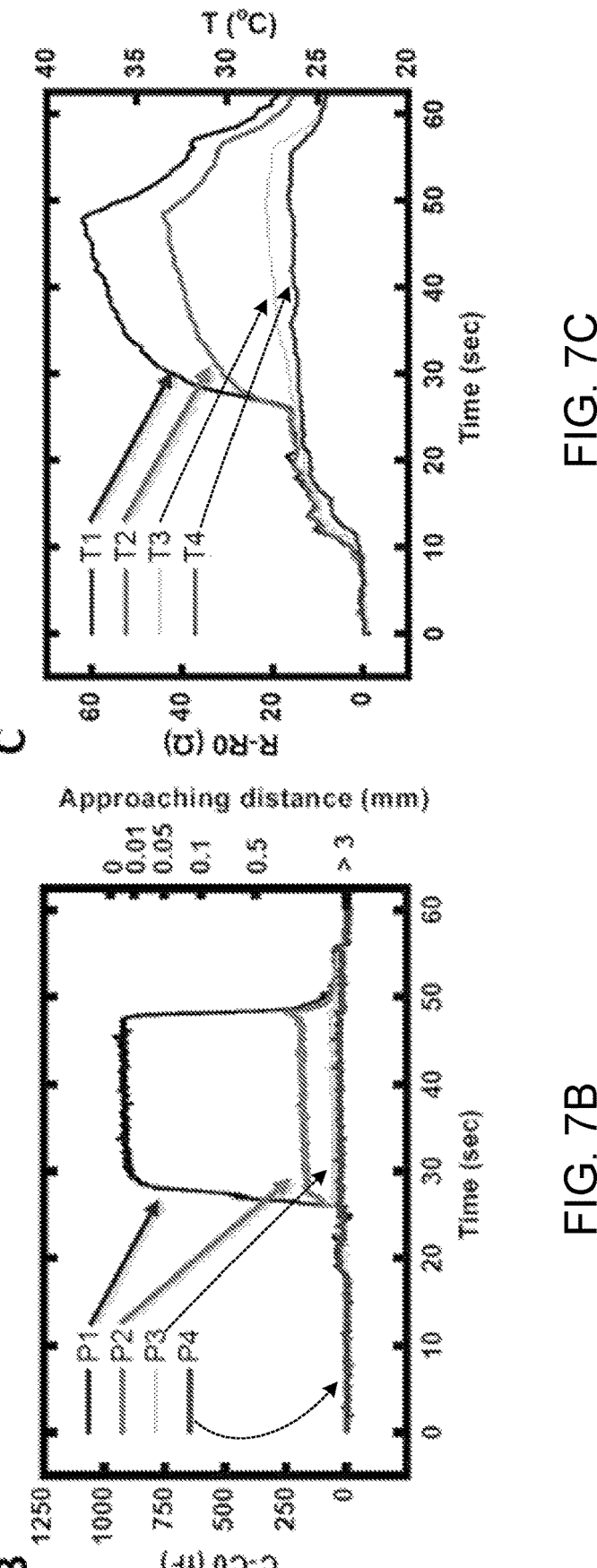

FIGS. 7A, 7B and 7C show results of the burrito-handling task. The contact is primarily at the distal sensors, P1, and to a lesser extent, P2. As the first sensors make contact, the increasing of pressure is stopped or reduced to avoid crushing the burrito; hence the proximity signals remain constant. The temperature sensors show a similar trend. The measured temperature is 38.6° C., which is close to the burrito temperature of 39.1° C. in this example. FIG. 7A depicts images from left to right, showing the finger approaching, contacting, conforming to, and releasing from a foil-wrapped burrito. As shown in FIGS. 7B and 7C, the graphs depict the corresponding proximity and temperature readings. The contact is primarily at P1 and T1, with partial contact at P2 and T2. After initial contact is detected, the pressure is held constant.

Figure 8A:
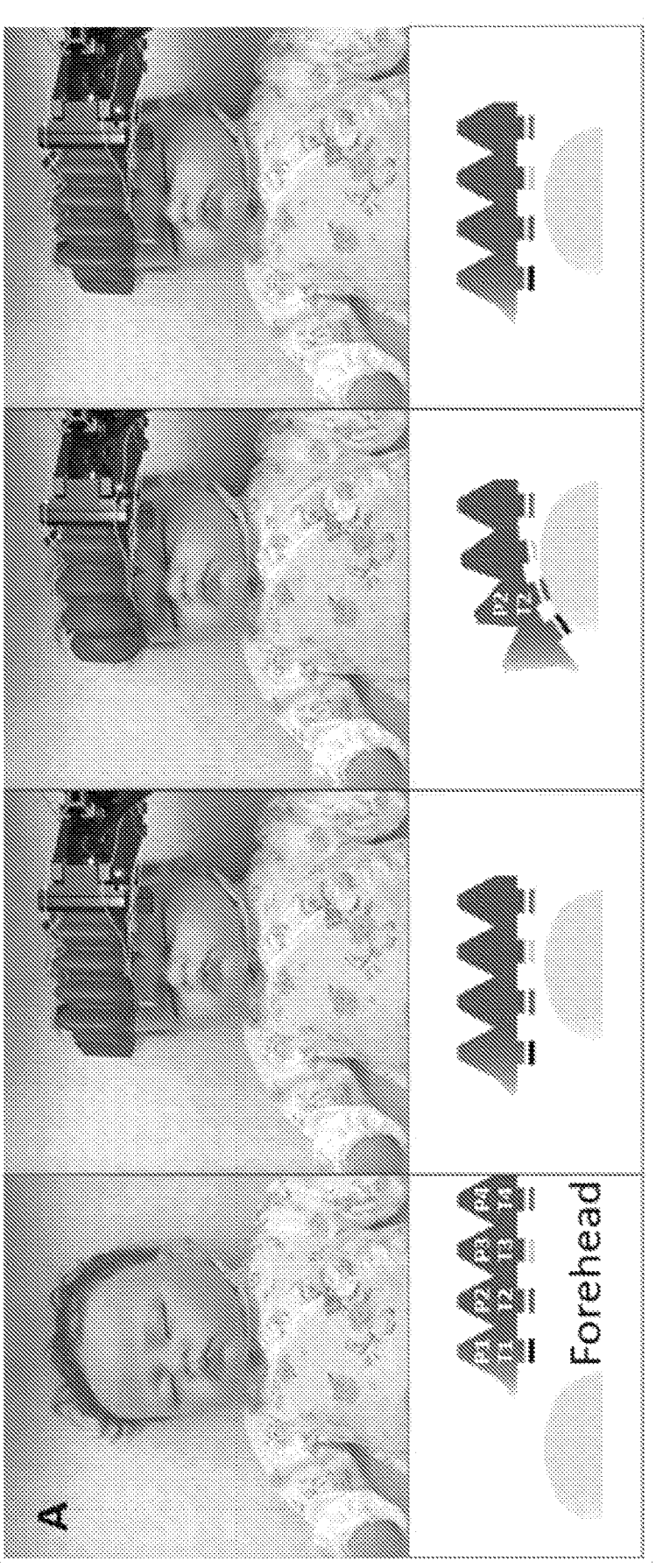
FIGS. 8A-8C show performance-related aspects of example sensor networks used in handling a baby's forehead, for which the sensor networks have temperature sensing and proximity sensing capabilities.
Figures 8B, 8C:
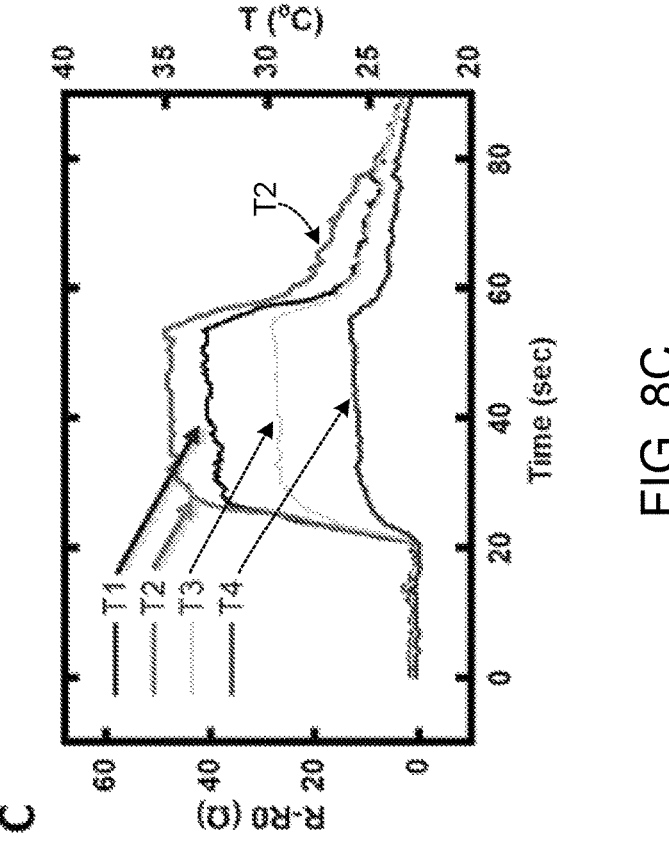

FIGS. 8A-8C show performance-related aspects of example sensor networks used in soft robot-human interaction (for the example of handling a baby's forehead) for which the sensor networks have temperature sensing and proximity sensing capabilities. As in the demonstration in connection with FIGS. 8A-8C, there are shown results for contacting the forehead of a doll. FIG. 8A shows images of a soft finger approaching and gently touching the forehead of a doll. Schematic of corresponding sensor contacts below. Plots in FIGS. 8B and 8C show corresponding proximity and temperature signals (calibrated data on the right vertical axis). With the doll's forehead warmed to an elevated temperature of 37.5° C., as measured by an IR thermometer, the combination of proximity and temperature sensing by such apparatuses according to the present disclosure is particularly useful for soft robot-human contact, allowing the robot to make gentle contact and allowing it to distinguish between living and nonliving surfaces and/or even to check for an elevated temperature. In this demonstration, the thermal contact sensors estimate the temperature as 36.3° C. (FIG. 8B), and the proximity sensors are again used to control the finger to maintain a constant light pressure of approximately 1 kPa after initial contact is detected.

In connection with various experimental/more-detailed example embodiments as described above, by using metalized plastic film that is patterned and cut using a UV laser, it is possible to create a stretchable network of sensors at reduced cost and, in certain of these example designs according to the present disclosure, a single processing step is used so that sensor networks are created within several minutes.

Via use of the UV laser (as in the above example) cutting can be achieved with traces of 130 μm width, separated by gaps of 20 μm. The traces can be designed as piezoresistive elements such as for temperature and/or strain sensing, and/or for designed as capacitive elements such as for proximity and/or contact sensing. Cuts in the metalized plastic film make it possible to create expandable interconnects in a Kirigami pattern; with such a pattern, a tiled array of 5×10 mm sensors may be created to expand to cover an area of 140×330 mm on the surface of a soft robot arm or hand. Once expanded, the network may be embedded in a stretchable silicone rubber skin for protection. When mounted on soft pneumatic fingers, the sensors are not affected by the flexing of the fingers.

In terms of constructing (or manufacturing) the example embodiment such as described above, to integrate the sensor network on a soft robotic finger, the flexible but not stretchable sensors may be placed on a comparatively stiff part of the fingers using 3M VHB double-sided tape. To read multiple resistive sensors with an analog to digital conversion, channel wire and ground wire from each sensor may be connected to the pins of a microcontroller (Adafruit Industries, Arduino MEGA). For capacitive signals, an evaluation board (Analog Devices, AD7147) may be used. In this example, a resistive sensor readout was recorded at 2-Hz and capacitive sensor readout at 25 kHz.

Figure 9A:
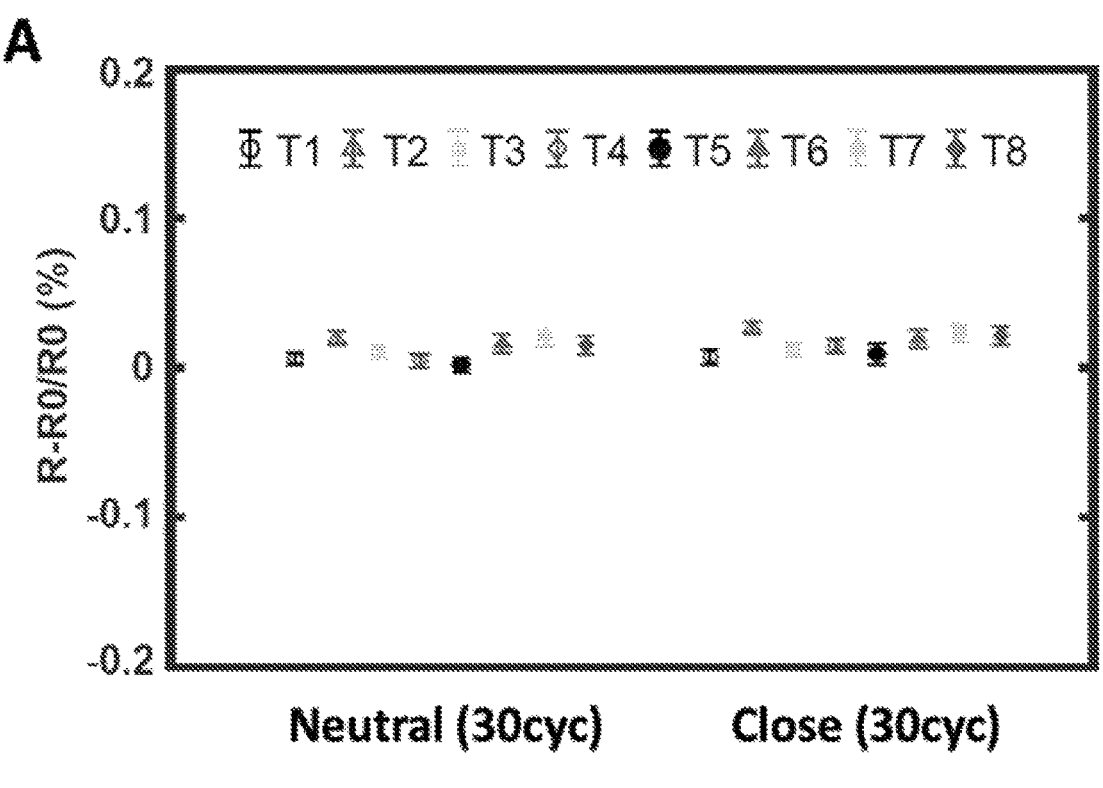
FIGS. 9A-9B show performance-related aspects of example sensor networks in connection with strain-independence for closing actuation of a pair of soft-robotic digits (FIG. 9A) and for opening actuation of a pair of soft-robotic digits (FIG. 9B).
Figure 9B:
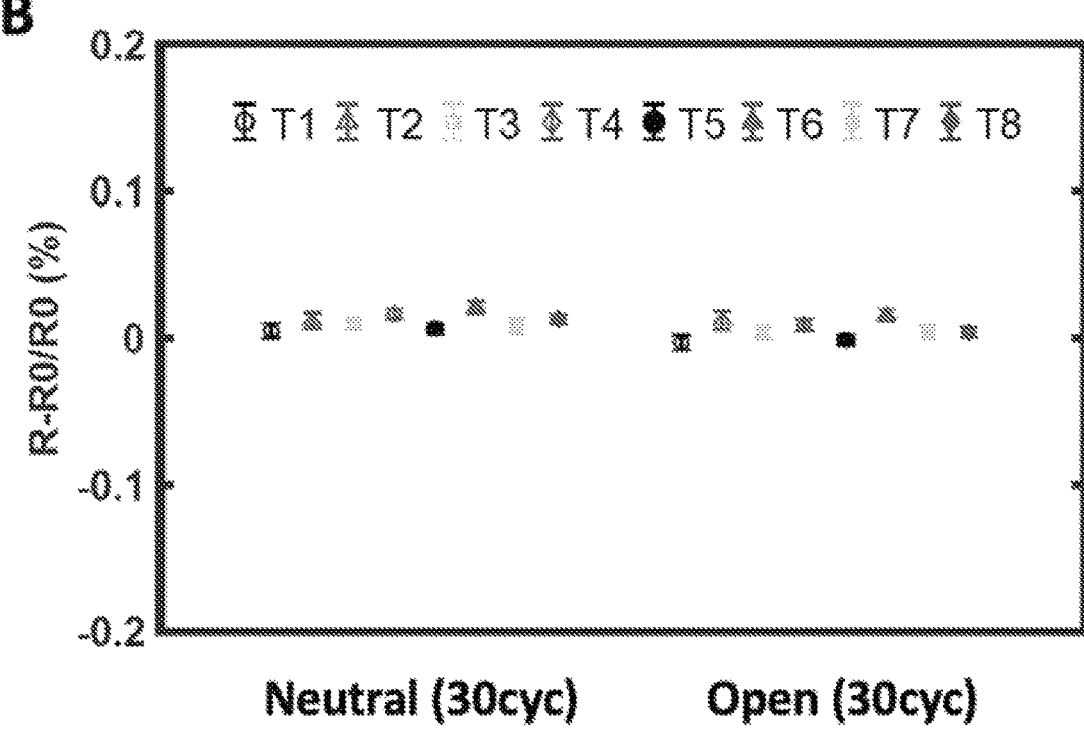

For integration of actuation-independent sensor network on the soft robotic hand, FIGS. 9A-9B show performance-related aspects of a particular set of example sensor networks, with strain-independence for closing actuation of a pair of soft-robotic digits (FIG. 9A) and for opening actuation of a pair of soft-robotic digits (FIG. 9B). Each of the graphs of FIGS. 9A and 9B use, for the vertical axis, impedance corresponding to the measured percent of resistance, R-RO/RO, where R corresponds to the measured impedance and where RO corresponds to initial impedance (e.g., resistance) before temperature influence. The horizontal axis of each of FIG. 9A and FIG. 9B indicates that the strain for each sensor (e.g., whether any of T1, T2 through T8) would be measured for 30 cycles between a neutral position and in an actuated (closed or open) position. The plotting of entries in the graphs shows nominal variations between neutral position and either closed actuation position (FIG. 9A) or open actuation position (FIG. 9B). With mean and standard deviation of the relative resistance of actuated and relaxed moments during 30 times maximum expansion and relaxation, the mean change in sensor signal is less than 0.026% over 30 cycles of a close, neutral, open, neutral sequence. The error bars show the standard error (<0.0071%) from the mean value, which is calculated by dividing the standard deviation by the square root of the number of measurements.

In certain of these more-detailed experimental examples, fabrication of such experimental sensor networks may be conducted on a metalized PET film (Thickness of 50 μm, from McMaster) with an aluminum thickness of 0.05 μm. The film samples are cut into 50×50 mm² pieces, cleaned by IPA (Isopropyl Alcohol), and dried. Then the film is temporarily fixed on a glass slide with a drop of water, which produces a surface tension between the film and the glass slide. Each such prepared sample is placed on the stage of a UV laser machine.

UV laser machining may be conducted by using a quasi-CW DPSS UV laser (DPSS Lasers Inc., Series 3500), with a calibrated power of 2.66 W on stage with 355 nm wavelength. The maximum power may be varied by changing the driving current, which can be programmed easily through software programming. It is driven by the laser beam from a laser diode to a built-in galvanometric beam scanning system.

The sample was mounted on the fixed stage of the Z-axis translator to adjust the focal point on the sample. Each pattern file for metal ablation and plastic cutting was prepared individually. The patterns of the sensor electrodes and the Kirigami wires were designed by a computer-aided design software (AutoCAD, Adobe). The parameters of the laser beam's power, scan rate, scan pass, and frequency were set by computer-aided laser marking software (WinLaser) for each pattern. In the marking software, the UV laser beam condition was set at 100% power, 30 kHz, a 7 times pass, 100 mm/s for cutting plastic of Kirigami wires and 100%, 60 kHz, single-pass, 2000 mm/s for ablating metal to pattern electrodes. The patterned stretchable and flexible sensor network may then be released from the glass slide by applying more water.

It is recognized and appreciated that as specific examples, the above-characterized figures and discussion are provided to help illustrate certain aspects (and advantages in some instances) which may be used in the manufacture of such structures and devices. These structures and devices include the exemplary structures and devices described in connection with each of the figures as well as other devices, as each such described embodiment has one or more related aspects which may be modified and/or combined with the other such devices and examples as described herein, and as may also be found in the Appendix of the above-referenced Provisional Application.

The skilled artisan would also recognize various terminology as used in the present disclosure by way of their plain meaning. As examples, the Specification may describe and/ or illustrates aspects useful for implementing the examples by way of various semiconductor materials/circuits, which may be illustrated as or using terms such as layers, skin, blocks, modules, devices, systems, units, controllers, and/or other circuit-type and material-specific depictions. Such semiconductor and/or semiconductive materials (including portions of semiconductor structure) and circuit elements and/or related circuitry may be used together with other elements to exemplify how certain examples may be carried out in the form or structures, steps, functions, operations, activities, etc. It would also be appreciated that terms to exemplify orientation, such as upper/lower, left/right, top/ bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed:

1. An apparatus comprising:
stretchable synthetic membrane material;
a plurality of separated sensors being uncoupled from one another by being separated, being secured to the stretchable synthetic membrane material and including at least one sensor to detect changes in capacitance; and
a series of patterned conductive or semiconductive sections, embedded in or secured against the stretchable synthetic membrane material, including a plurality of bend nodes adjoining ones of the sections with each bend node having an inner portion facing or directed inwardly and with one of the plurality of bend nodes being electrically and physically coupled to the at least one sensor, and wherein the stretchable synthetic membrane material is to be stretched to cause an expansion by at least partially unfolding of the plurality of bend nodes without the at least one sensor expanding or stretching, while the at least one sensor detects changes in capacitance associated with a difference in proximity between the at least one sensor and an external target object.

2. The apparatus of claim 1, further including a base or housing against or towards which the stretchable synthetic membrane material is to be secured in a stretched mode, and wherein each of the one or more bend nodes is a hub of a wishbone-shaped structure with the adjoined ones of the sections corresponding to legs of the wishbone-shaped structure, the at least one sensor is not stretchable and configured to be expandable by unfolding, and one or more of the sections with each bend node is configured to convey energy from the at least one sensor.

3. The apparatus of claim 1, further including a robotic digit, and wherein the series of patterned conductive or semiconductive sections and the stretchable synthetic membrane material are stretched due to movement of the robotic digit, and the stretchable synthetic membrane material includes a side, facing or directed outwardly, shaped with an undulating surface to facilitate inward bending or stretching of the stretchable synthetic membrane material.

4. The apparatus of claim 1, further including a robotic member, wherein the stretchable synthetic membrane material and the series of patterned conductive or semiconductive sections are secured against the robotic member, and wherein the at least one sensor is configured to detect an external object in response to at least one variable parameter associated with the object, wherein the at least one variable parameter includes at least one or a combination of: proximity, capacitance, temperature, impedance, contact with the object, and movement of the robotic member relative to the external object.

5. The apparatus of claim 1, wherein the plurality of separated sensors are to operate concurrently.

6. The apparatus of claim 1, wherein each of the one or more bend nodes is to transition to a stretched mode by unfolding at least partially so as to permit the stretchable synthetic membrane material to stretch without straining the adjoined sections along length directions defining the respective adjoined sections.

7. The apparatus of claim 1, wherein a plurality of said one or more bend nodes includes at least one turn or corner, and therein forming a winding shape.

8. The apparatus of claim 1, further including a robotic member and wherein the plurality of separated sensors are to sense changes in distance and in temperature which, during operation of the apparatus, occurs in response to the robotic member moving relative to an object while the plurality of separated sensors are secured to and move with robotic member.

9. The apparatus of claim 1, further including a soft robotic hand and wherein each of the plurality of separated sensors is connected via the patterned conductive or semiconductive sections, and wherein the series of patterned sections and the stretchable synthetic membrane material form a multi-modal stretchable sensor network which is integrated with the soft robotic hand, and which is configured for sensing temperature and proximity concurrently.

10. A method for use with a plurality of individual sensors uncoupled from one another by being separated, the method comprising:
providing a series of patterned conductive or semiconductive sections, embedded in or secured against a stretchable synthetic membrane material, including a plurality of bend nodes adjoining ones of the sections with each bend node having an inner portion facing or directed inwardly and with one of the plurality of bend nodes being electrically and physically coupled to at least one sensor from among the plurality of individual sensors, and
using the stretchable synthetic membrane material in a stretched mode, due to a force that causes the plurality of bend nodes to expand by at least partially unfolding, while the at least one sensor detects changes in capacitance associated with a difference in proximity between the at least one sensor and an external target object.

11. The method of claim 10, further including securing the stretchable synthetic membrane material in a stretched mode against or as part of a base or housing, and wherein while the stretchable synthetic membrane material is in a stretched mode, the at least one sensor senses at least an aspect of an environment that is proximal to the base or housing.

12. The method of claim 10, wherein each of the one or more bend nodes is a hub of a wishbone-shaped structure with the adjoined ones of the sections corresponding to legs of the wishbone-shaped structure, and wherein the at least one sensor is not stretchable.

13. The method of claim 10, further including securing the stretchable synthetic membrane material and the series of patterned conductive or semiconductive sections against a robotic digit, and wherein the at least one sensor detects an external object in response to movement of the robotic digit, or at least one variable associated with the object, wherein the at least one variable includes at least one or a combination of: proximity, capacitance, temperature, contact of the object, and impedance.

14. The method of claim 10, further including stretching the stretchable synthetic membrane material along at least one curved or planar direction to fit a base or housing while each of the one or more bend nodes is to facilitate the adjoined ones of the sections to separate at ends distal from the one or more bend nodes without causing the at least one sensor to stretch.

15. The method of claim 10, wherein each of the one or more bend nodes is to transition to a stretched mode by unfolding at least partially so as to permit the stretchable synthetic membrane material to stretch without straining the adjoined sections along length directions which define the respective adjoined sections.

16. The method of claim 10, further including patterning the conductive or semiconductive sections using 3D printing and/or laser ablation.

17. The method of claim 10, further including patterning the conductive or semiconductive sections using 3D printing and/or laser ablation, and forming at least one pad, in the stretchable synthetic membrane material, shaped to receive the at least one or more sensors.

18. The method of claim 10, further including providing a thin conductive or semiconductive film on the stretchable synthetic membrane material, and then patterning the conductive or semiconductive sections by using a UV laser at a sufficiently high operating power to remove, by ablation, sections of the thin conductive or semiconductive film while the thin conductive or semiconductive film is on the stretchable synthetic membrane material, the sufficiently high operating power of the UV laser being below a level that cuts through and thereby degrades a stretchability parameter of the stretchable synthetic membrane material.

19. An apparatus for use with stretchable synthetic membrane material, the apparatus comprising:

a series of patterned conductive or semiconductive sections, embedded in or secured against the stretchable synthetic membrane material, including a plurality of bend nodes adjoining ones of the sections with each bend node having an inner portion facing or directed inwardly and with one of the plurality of bend nodes being electrically and physically coupled to a plurality of individual sensors, the plurality of individual sensors being uncoupled by being separated from one another and including at least one sensor that is configured to detect changes in capacitance, wherein the stretchable synthetic membrane material is to be stretched, due to a force that causes the plurality of bend nodes to expand by at least partially unfolding without causing the at least one sensor to be stretched or expanded, while the at least one sensor detects changes in capacitance associated with a difference in proximity between the at least one sensor and an external target object.

20. The apparatus of claim 19, wherein the at least one sensor is secured to the stretchable synthetic membrane material and detects changes in capacitance.

* * * * *